US008036196B2

(12) United States Patent
Sugaya

(10) Patent No.: US 8,036,196 B2
(45) Date of Patent: Oct. 11, 2011

(54) WIRELESS COMMUNICATION APPARATUS, WIRELESS COMMUNICATION SYSTEM, WIRELESS COMMUNICATION METHOD AND PROGRAM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 11/945,041

(22) Filed: Nov. 26, 2007

(65) Prior Publication Data

US 2008/0144584 A1   Jun. 19, 2008

(30) Foreign Application Priority Data

Dec. 13, 2006   (JP) ............................... P2006-336285

(51) Int. Cl.
*H04W 4/00* (2009.01)
(52) U.S. Cl. .................... 370/341; 370/322; 370/329
(58) Field of Classification Search .......... 370/321–323, 370/326, 328–330, 336, 337, 340, 341, 347, 370/348; 455/422.1, 434, 455–456.4, 464, 455/509, 515, 516, 161.1–166.2, 179.1
See application file for complete search history.

(56) References Cited

U.S. PATENT DOCUMENTS

| 5,442,659 | A * | 8/1995 | Bauchot et al. ............... 375/134 |
| 6,788,665 | B1 * | 9/2004 | Vancraeynest ................ 370/337 |
| 2005/0009487 | A1 * | 1/2005 | Puma ........................... 455/214 |
| 2006/0023670 | A1 * | 2/2006 | Kim et al. ..................... 370/337 |
| 2006/0171305 | A1 * | 8/2006 | Stefani et al. ................ 370/228 |
| 2007/0230540 | A1 * | 10/2007 | Eastburn ...................... 375/132 |

FOREIGN PATENT DOCUMENTS

| JP | 2002-540643 | 11/2002 |
| WO | WO 00/16532 | 3/2000 |

* cited by examiner

*Primary Examiner* — Kwang B Yao
*Assistant Examiner* — Kenan Cehic
(74) *Attorney, Agent, or Firm* — Finnegan, Henderson, Farabow, Garrett & Dunner, L.L.P.

(57) ABSTRACT

A wireless communication apparatus includes: a channel setting portion that sets an working channel and an acquisition channel; a remainder obtaining portion that obtains a remaining time length that can be used to wirelessly communicate with the wireless communication apparatuses that form part of the same wireless network using the working channel; a remainder determination portion that determines if the remaining time length is equal to or less than a specified acquisition reference remaining number and equal to less than a specified change reference remaining number; and if the remainder determination portion determines that the remaining time length is equal to or less than the change reference remaining number, an acquisition portion acquires signals transmitted using the acquisition channel and the channel setting portion changes the working channel based on the signals that have been acquired by the acquisition portion.

15 Claims, 15 Drawing Sheets

FIG.5

| CHANNEL NUMBER | FREQUENCY HOPPING SUB BAND ID | | | | | | PREAMBLE |
|---|---|---|---|---|---|---|---|
| TFC:1 | SUB BAND 1 | SUB BAND 2 | SUB BAND 3 | SUB BAND 1 | SUB BAND 2 | SUB BAND 3 | SEQUENCE 1 |
| TFC:2 | SUB BAND 1 | SUB BAND 3 | SUB BAND 2 | SUB BAND 1 | SUB BAND 3 | SUB BAND 2 | SEQUENCE 2 |
| TFC:3 | SUB BAND 1 | SUB BAND 1 | SUB BAND 2 | SUB BAND 2 | SUB BAND 3 | SUB BAND 3 | SEQUENCE 3 |
| TFC:4 | SUB BAND 1 | SUB BAND 1 | SUB BAND 3 | SUB BAND 3 | SUB BAND 2 | SUB BAND 2 | SEQUENCE 4 |
| TFC:5 | SUB BAND 1 | SUB BAND 1 | SUB BAND 1 | SUB BAND 1 | SUB BAND 1 | SUB BAND 1 | SEQUENCE 5 |
| TFC:6 | SUB BAND 2 | SUB BAND 2 | SUB BAND 2 | SUB BAND 2 | SUB BAND 2 | SUB BAND 2 | SEQUENCE 6 |
| TFC:7 | SUB BAND 3 | SUB BAND 3 | SUB BAND 3 | SUB BAND 3 | SUB BAND 3 | SUB BAND 3 | SEQUENCE 7 |

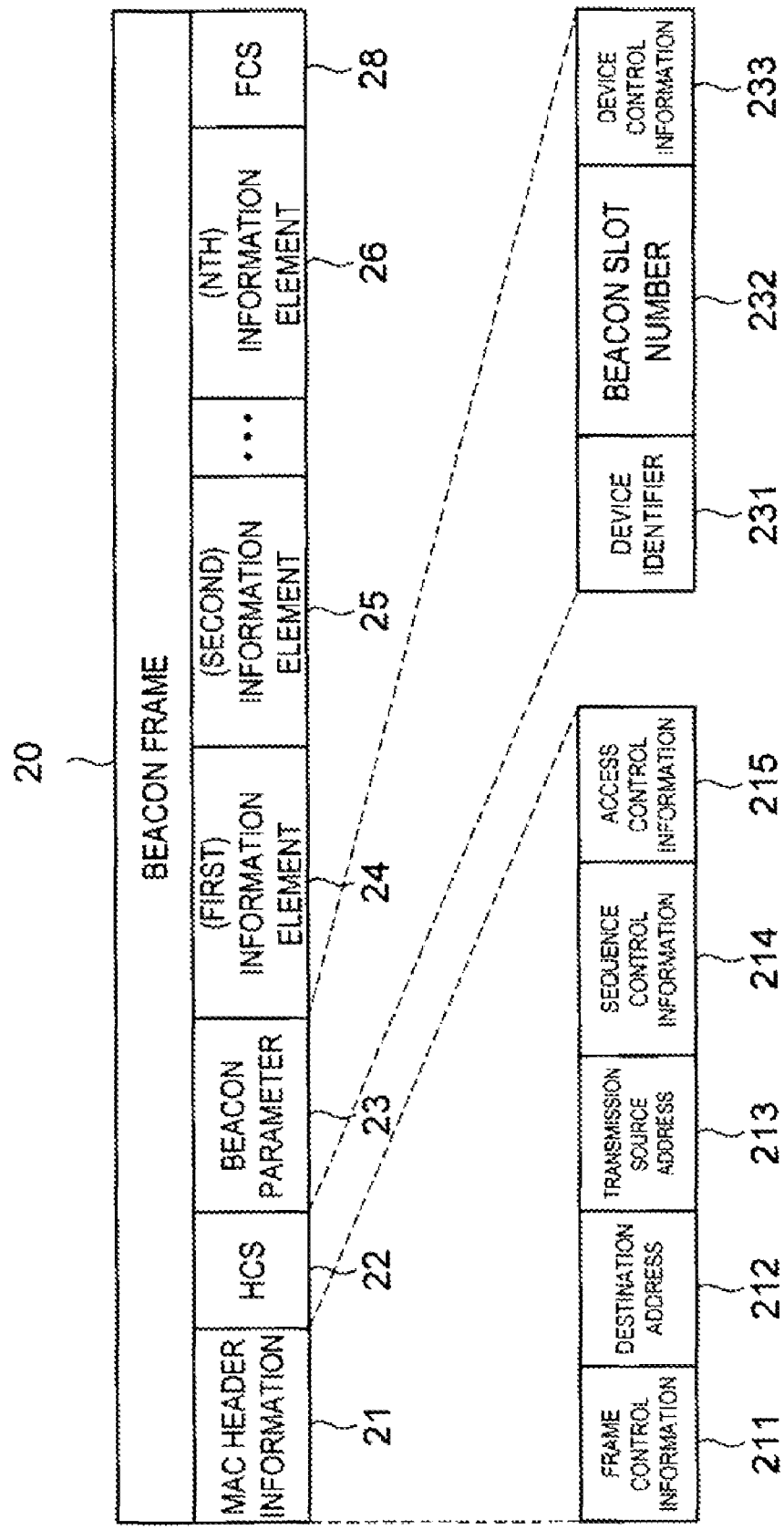

FIG.7A

BEACON PERIOD OCCUPANCY INFORMATION ELEMENT (240)

| ELEMENT IDENTIFIER | INFORMATION LENGTH | BEACON PERIOD LENGTH | BEACON SLOT INFORMATION BIT MAP | (FIRST) DEVICE ADDRESS | ... | (NTH) DEVICE DDRESS |
|---|---|---|---|---|---|---|
| 241 | 242 | 243 | 244 | 245 | | 246 |

FIG.7B

CHANNEL CHANGE INFORMATION ELEMENT (250)

| ELEMENT IDENTIFIER | INFORMATION LENGTH | CHANNEL CHANGE COUNT DOWN | NEW CHANNEL NUMBER |
|---|---|---|---|
| 251 | 252 | 253 | 254 |

FIG.7C

DISTRIBUTED RESERVATION PROTCOL INFORMATION ELEMENT (260)

| ELEMENT IDENTIFIER | INFORMATION LENGTH | DRP CONTROL INFORMATION | TARGET DEVICE ADDRESS INFORMATION | (FIRST) DRP ALLOCATION | ... | (NTH) DRP ALLOCATION |
|---|---|---|---|---|---|---|
| 261 | 262 | 263 | 264 | 265 | | 266 |

FIG.7D

BEACON PERIOD SWITCH INFORMATION ELEMENT (270)

| ELEMENT IDENTIFIER | INFORMATION LENGTH | BEACON MOVE COUNT DOWN | CHANGE SLOT OFFSET | CHANGE BPST OFFSET |
|---|---|---|---|---|
| 271 | 272 | 273 | 274 | 275 |

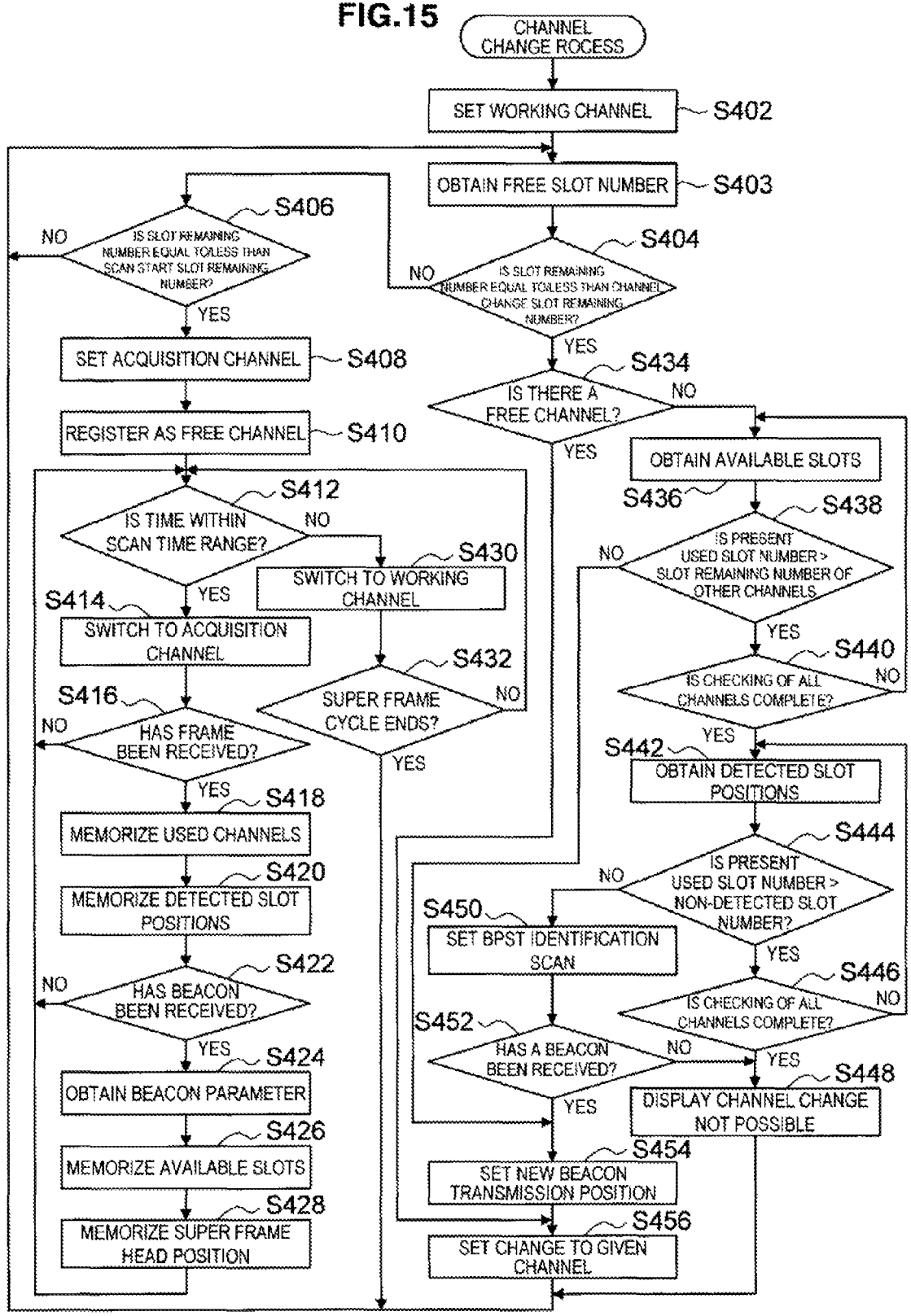

WIRELESS COMMUNICATION APPARATUS, WIRELESS COMMUNICATION SYSTEM, WIRELESS COMMUNICATION METHOD AND PROGRAM

CROSS REFERENCES TO RELATED APPLICATIONS

The present invention contains subject matter related to Japanese Patent Application JP 2006-336285 filed in the Japan Patent Office on Dec. 13, 2006, the entire contents of which being incorporated herein by reference.

BACKGROUND OF THE INVENTION

1. Field of the Invention

The present invention relates to a wireless communication apparatus, a wireless communication system, a wireless communication method, and a program.

2. Description of the Related Art

Recently, in the WiMedia Alliance, as a specification for access control methods using ultra wide band (UWB), a standard related to distributed media access control for wireless networks has been drawn up.

In the standard related to distributed media access control for wireless networks, methods are defined such as a method in which a wireless communication apparatus transmits a beacon signal to notify its existence to wireless communication apparatuses in the vicinity, and a method in which beacon signals transmitted from wireless communication apparatuses in the vicinity are acquired. In addition, in the standard related to distributed media access control for wireless networks, another method is defined in which the wireless communication apparatuses pre-determine time slots (MAS) for transmitting and receiving data signals between each other, then reserve a specific MAS, and transmit/receive the data signals in the reserved MAS.

According to this type of standard related to distributed media access control for wireless networks, an autonomous distributed network can be configured in which each wireless communication apparatus includes various types of access control information in respective beacon signals which are then transmitted as necessary, and receives beacon signals including access control information from wireless communication apparatuses in the vicinity.

Examples of the access control information include a channel change information element (channel change IE) for notifying wireless communication apparatuses in the vicinity when an working channel used in wireless communication is changed, a beacon period switch information element (BP switch IE) for changing the start time of a super frame cycle or a slot position for transmitting a beacon signal, and the like. Note that, in order to ensure transmission efficiency, it is desirable that the channel change IE is used to change the working channel to a low traffic channel.

Alternatively, in International Publication No. WO00/16532, a channel switching method is disclosed for a server-client computer network. The channel switching method switches to a different channel in the case that continued use of a channel becomes problematic. More specifically, the channel switching method is a method in which, in the case that continued used of the channel presently being used in the computer network becomes problematic, the server waits to receive from a different channel, and switches from the present channel to a different channel that has less interference.

SUMMARY OF THE INVENTION

However, according to the known channel switching method, while the server is waiting to receive from a different channel, the client of the computer network is instructed to not transmit any signals. More specifically, prior to switching the channel, the server of the computer network is able to determine the usage state of different channels by waiting to receive from a different channel. However, while the server is waiting to receive it is necessary to temporarily halt the present wireless communication in the computer network.

Moreover, if the configuring elements of the autonomous distributed computer network wait to receive as described above, there are cases when it is not possible to maintain the prior state of wireless communication after waiting to receive. More particularly, the known channel switching method was not proposed with an autonomous distributed wireless network in mind, and thus it is problematic to use the known channel switching method for an autonomous distributed wireless network.

The present invention addresses the above-identified and other problems and provides a new and innovative wireless communication apparatus, wireless communication system, wireless communication method and program that can appropriately change an working channel in an autonomous distributed wireless network.

According to an embodiment of the present invention, there is provided a wireless communication apparatus that forms part of an autonomous distributed wireless network that uses a time division control system and is in a wireless communication system including a plurality of wireless communication apparatuses in respective wireless networks. The wireless communication apparatus performs wireless communication using an working channel that is commonly used with wireless communication apparatuses that form part of the same wireless network. The wireless communication apparatus includes: a channel setting portion that sets an working channel and an acquisition channel, the working channel being used to wirelessly communicate with the wireless communication apparatuses that form part of the same wireless network, and the acquisition channel being used to acquire signals transmitted from other wireless communication apparatuses not in the same wireless network; a remainder obtaining portion that obtains a remaining time length that can be used to wirelessly communicate with the wireless communication apparatuses that form part of the same network using the working channel set by the channel setting portion; an acquisition portion that acquires signals transmitted from the other wireless communication apparatuses using the acquisition channel set by the channel setting portion; and a remainder determination portion that determines whether the remaining time length obtained by the remainder obtaining portion is equal to or less than a specified acquisition reference remaining number and determines whether the remaining time length is equal to or less than a specified change reference remaining number.

If the remainder determination portion determines that the remaining time length is equal to or less than the acquisition reference remaining number, the acquisition portion acquires signals transmitted from the other wireless communication apparatuses using the acquisition channel, and if the remainder determination portion determines that the remaining time length is equal to or less than the change reference remaining number, the channel setting portion changes the working channel based on the signals that have been acquired from the other wireless communication apparatuses by the acquisition portion.

According to the above-described structure, the remainder determination portion determines (1) whether the remaining time length obtained by the remainder obtaining portion is equal to or less than the acquisition reference remaining number, and (2) whether the remaining time length obtained by the remainder determination portion is equal to or less than the change reference remaining number. The fact that the remainder determination portion determines that the remaining time length is equal to or less than the acquisition reference remaining number is used as a trigger for the acquisition portion to acquire signals transmitted using the acquisition channel set by the channel setting portion. Further, the fact that the remainder determination portion determines that the remaining time length is equal to or less than the change reference remaining number is used as a trigger for the channel setting portion to change the working channel. With this configuration it is possible to determine the wireless communication usage state for use of the acquisition channel based on the signals acquired by the acquisition portion. Thus, the channel setting portion can change the working channel to a channel that has a more suitable wireless communication usage state.

In addition, the acquisition portion acquires the signals that allow the wireless communication usage state of each acquisition channel to be determined prior to when the remaining time length is equal to or less than the change reference remaining number. As a result, when the remaining time length becomes equal to or less than the change reference remaining number, the channel setting portion can smoothly change the working channel to the channel that has a more suitable wireless communication usage state.

The change reference remaining number may be a number that corresponds with the number of wireless communication apparatuses that form the same wireless network. In the case that there is a large amount of free time for wireless communication in the wireless network that uses the time division control system, there is a low probability that the time slots that different wireless communication apparatuses attempt to reserve for wireless communication will overlap. On the other hand, in the case that there is only a small amount of free time for wireless communication in the wireless network using the time division control system, there is a high probability that the time slots that different wireless communication apparatuses attempt to reserve for wireless communication will overlap. Moreover, if the number of wireless communication apparatuses that form the same wireless network is large, there is a high probability that the number of wireless communication apparatuses that attempt to reserve time slots for wireless communication will increase, and thus a higher probability that there will be overlap of the time slots that different wireless communication apparatuses attempt to reserve for wireless communication. Assuming hypothetically that the time slots that different wireless communication apparatuses attempted to reserve for wireless communication did overlap, it is necessary to perform a troublesome adjustment process related to the time slots reserved by the wireless communication apparatuses. Given the above circumstances, if the change reference remaining number is set to a larger value as the number of wireless communication apparatuses that form the same wireless network increases, and the change reference remaining number is set to a smaller value as the number of wireless communication apparatuses that form the same wireless network decreases, it is possible to change the probability that overlap will occur between the time slots that different wireless communication apparatuses attempt to reserve for wireless communication.

The acquisition reference remaining number may be a number that corresponds with the number of types of acquisition channel that are set by the channel setting portion. For example, if the number of different types of acquisition channel set by the channel setting portion is large, the time needed for the acquisition portion to acquire signals transmitted from the other wireless communication apparatuses using each acquisition channel is longer. On the other hand, if the number of different types of acquisition channel set by the channel setting portion is small, the time needed for the acquisition portion to acquire signals transmitted from the other wireless communication apparatuses using each acquisition channel is shorter. Moreover, when the remaining time length becomes equal to or less than the change reference remaining number, it is desirable that the acquisition portion ends acquisition of the signals transmitted using the acquisition channel. Given the above, if the acquisition reference remaining number is set to a larger value as the number of types of acquisition channel set by the channel setting portion increases, and is set to a smaller value as the number of types of acquisition channel set by the channel setting portion decreases, it is possible to increase the probability that the acquisition portion will have completed acquisition of signals transmitted using all of the acquisition channels by the time when the remaining time length becomes equal to or less than the change reference remaining number.

The change reference remaining number may be a value that is based on the remaining time length that can be used for wireless communication using each acquisition channel, the remaining time length being estimated from signals acquired from the other wireless communication apparatuses by the acquisition portion. If this configuration is adopted, for example, if the average remaining time length that can be used for wireless communication using each acquisition channel estimated from the signals acquired from the other wireless communication apparatuses by the acquisition portion is large, the change reference remaining number can be set to a large value. Accordingly, in the case that the wireless communication of the wireless network that the wireless communication apparatus is a member of is relatively crowded as compared to other wireless networks, the working channel can be changed to the working channel of another wireless network, thereby evening out the wireless communication traffic of each wireless network.

The acquisition portion may acquire, while the wireless communication apparatus does not wirelessly communicate with the wireless communication apparatuses that form part of the same wireless network, signals that are transmitted from the other wireless communication apparatuses not in the same wireless network using the acquisition channel. In the above-described structure, the wireless communication apparatus can perform fundamental wireless communication with the wireless communication apparatuses that form part of the same wireless network in parallel to acquiring using the acquisition portion the signals that are transmitted from the other wireless communication apparatus using the acquisition channel. More specifically, the acquisition portion can acquire the signals transmitted from the other wireless communication apparatuses without interfering with fundamental wireless communication of the wireless communication apparatus.

The time division control system may be a system that performs wireless communication using slot units that are obtained by time dividing frames with a specified cycle, and the channel setting portion may change the acquisition channel for each frame in the time division control system.

The acquisition portion may acquire beacon signals from the other wireless communication apparatuses not in the same wireless network, and the channel setting portion may change the working channel based on time slot reservation information included in the beacon signals. In the above-described configuration, the channel setting portion can determine which time slots are reserved for wireless communication by the other wireless communication apparatuses simply by referring to the beacon signals acquired from the other wireless communication apparatuses.

The acquisition portion may acquire data signals from the other wireless communication apparatuses not in the same wireless network, and the channel setting portion may change the working channel based on a time length for which the acquisition portion acquired the data signals. In the above-described configuration, the wireless communication apparatus can determine the wireless communication usage state for each acquisition channel based on the time length for which the acquisition portion acquired the data signals transmitted from the other wireless communication apparatuses using the acquisition channel.

The channel setting portion may change the working channel, based on an acquisition result for the signals acquired by the acquisition portion, to a channel that is not used for wireless communication by the other wireless communication apparatuses not in the same wireless network. If the above-described structure is adopted, it is possible for the wireless communication apparatus to ensure adequate time for wireless communication after changing the working channel because the working channel is changed to a channel that is not used for wireless communication by the other wireless communication apparatuses.

The channel setting portion may change the working channel, based on an acquisition result for the signals acquired by the acquisition portion, to a channel for which a time length that is not used for wireless communication by the other wireless communication apparatuses not in the same wireless network is equal to or more than a time length that is, at the least, to be reserved in the wireless network by the wireless communication apparatus. If the above-described configuration is adopted, the channel setting portion changes the working channel to a channel for which the time length that is not used by the other wireless communication apparatuses for wireless communication is equal to or more than the time length that is, at the least, to be reserved in the wireless network by the wireless communication apparatus. Accordingly, the wireless communication apparatus can, at the least, reserve more time for wireless communication after the working channel has been changed as compared to before when the working channel was changed. In addition, it is also possible to reduce, at the least, the occurrence of overlap between the time slots that the wireless communication apparatus attempts to reserve and the time slots that the other wireless communication apparatuses attempt to reserve after the working channel has been changed as compared to before when the working channel was changed.

The channel setting portion may change the working channel to a wireless channel that has, among the acquisition channels that have been used by the acquisition portion to acquire the signals, the longest time length that is not used by the other wireless communication apparatuses for wireless communication. If the above-described structure is adopted, the channel setting portion changes the working channel to a wireless channel that has, among the acquisition channels that have been used by the acquisition portion to acquire the signals, the longest time length that is not used by the other wireless communication apparatuses for wireless communication. Accordingly, the wireless communication apparatus can ensure adequate time for performing wireless communication after the working channel is changed.

The time division control system may be a system that performs wireless communication using slot units that are obtained by time dividing a frame with a specified cycle. Further, the wireless communication apparatus may further include a synchronization portion that, in the case that the channel setting portion changes the working channel to another channel that is being used to transmit beacon signals by the other wireless communication apparatuses not in the same wireless network, synchronizes the frame with a frame used by the other wireless communication apparatuses. If the above-described structure is adopted, the frame can be synchronized with the frame used by the other wireless communication apparatuses at the same time as the channel setting portion changes the working channel.

According to another embodiment of the present invention, there is provided a wireless communication system including a plurality of wireless communication apparatuses that form autonomous distributed wireless networks that use a time division control system, each wireless communication apparatus performing wireless communication using an working channel that is commonly used with the wireless communication apparatuses that form part of each wireless network. Each of the wireless communication apparatuses includes: a channel setting portion that sets an working channel and an acquisition channel, the working channel being used to wirelessly communicate with the wireless communication apparatuses that form part of the same wireless network, and the acquisition channel being used to acquire signals transmitted from other wireless communication apparatuses not in the same wireless network; a remainder obtaining portion that obtains a remaining time length that can be used to wirelessly communicate with the wireless communication apparatuses that form part of the same wireless network using the working channel set by the channel setting portion; an acquisition portion that acquires signals transmitted from the other wireless communication apparatuses using the acquisition channel set by the channel setting portion; and a remainder determination portion that determines whether the remaining time length obtained by the remainder obtaining portion is equal to or less than a specified acquisition reference remaining number, and determines whether the remaining time length is equal to or less than a specified change reference remaining number. If the remainder determination portion determines that the remaining time length is equal to or less than the acquisition reference remaining number, the acquisition portion acquires signals transmitted from the other wireless communication apparatuses using the acquisition channel. If the remainder determination portion determines that the remaining time length is equal to or less than the change reference remaining number, the channel setting portion changes the working channel based on the signals that have been acquired from the other wireless communication apparatuses by the acquisition portion.

According to another embodiment of the present invention, there is provided a wireless communication method for wireless communication apparatuses that form respective autonomous distributed wireless networks that use a time division control system, each wireless communication apparatus performing wireless communication using an working channel that is commonly used with the wireless communication apparatuses that form part of each wireless network. The wireless communication method includes the steps of: setting an working channel that is used to wirelessly communicate with the wireless communication apparatuses that form part of the same wireless network; obtaining a remaining time length that can be used to wirelessly communicate with the wireless communication apparatuses that form part of the same wireless network using the working channel set by the channel setting portion; determining whether the obtained remaining time length is equal to or less than an acquisition reference remaining number; setting, if the obtained remaining time length is determined to be equal to or less than the acquisition reference remaining number, an acquisition channel that is used to acquire signals transmitted from other wireless communication apparatuses not in the same wireless network; acquiring signals transmitted from the other wireless communication apparatuses using the acquisition channel; determining whether the obtained remaining time length is equal to or less than a specified change reference remaining number; and changing the working channel based on the acquired signals if the obtained remaining time length is determined to be less than or equal to the change reference remaining number.

According to another embodiment of the present invention, there is provided a computer program that causes a computer to perform the steps of: setting an working channel that is used to perform wireless communication by wireless communication apparatuses that form part of an autonomous distributed wireless network that uses a time division control system; obtaining a remaining time length that can be used to wirelessly communicate with the wireless communication apparatuses that form part of the same wireless network using the working channel set by the channel setting portion; determining whether the obtained remaining time length is equal to or less than an acquisition reference remaining number; setting, if the obtained remaining time length is determined to be equal to or less than the acquisition reference remaining number, an acquisition channel that is used to acquire signals transmitted from other wireless communication apparatuses not in the same wireless network; acquiring signals transmitted from the other wireless communication apparatuses using the acquisition channel; determining whether the obtained remaining time length is equal to or less than a specified change reference remaining number; and changing the working channel based on the acquired signals if the obtained remaining time length is determined to be less than or equal to the change reference remaining number.

According to the embodiments of the present invention described above it is possible to appropriately change the working channel used in the autonomous distributed wireless network.

BRIEF DESCRIPTION OF THE DRAWINGS

FIG. 5 is an explanatory figure that shows an example of frequency hopping patterns of channels for wireless communication;

FIG. 6 is an explanatory figure that shows an example of the configuration of a beacon frame;

FIG. 7A is an explanatory figure that shows an example of an information element;

FIG. 7B is an explanatory figure that shows an example of another information element;

FIG. 7C is an explanatory figure that shows an example of another information element;

FIG. 7D is an explanatory figure that shows an example of another information element;

FIG. 15 is a flow chart showing a wireless communication method used by the wireless communication apparatus.

DETAILED DESCRIPTION OF THE PREFERRED EMBODIMENTS

Figure 1:
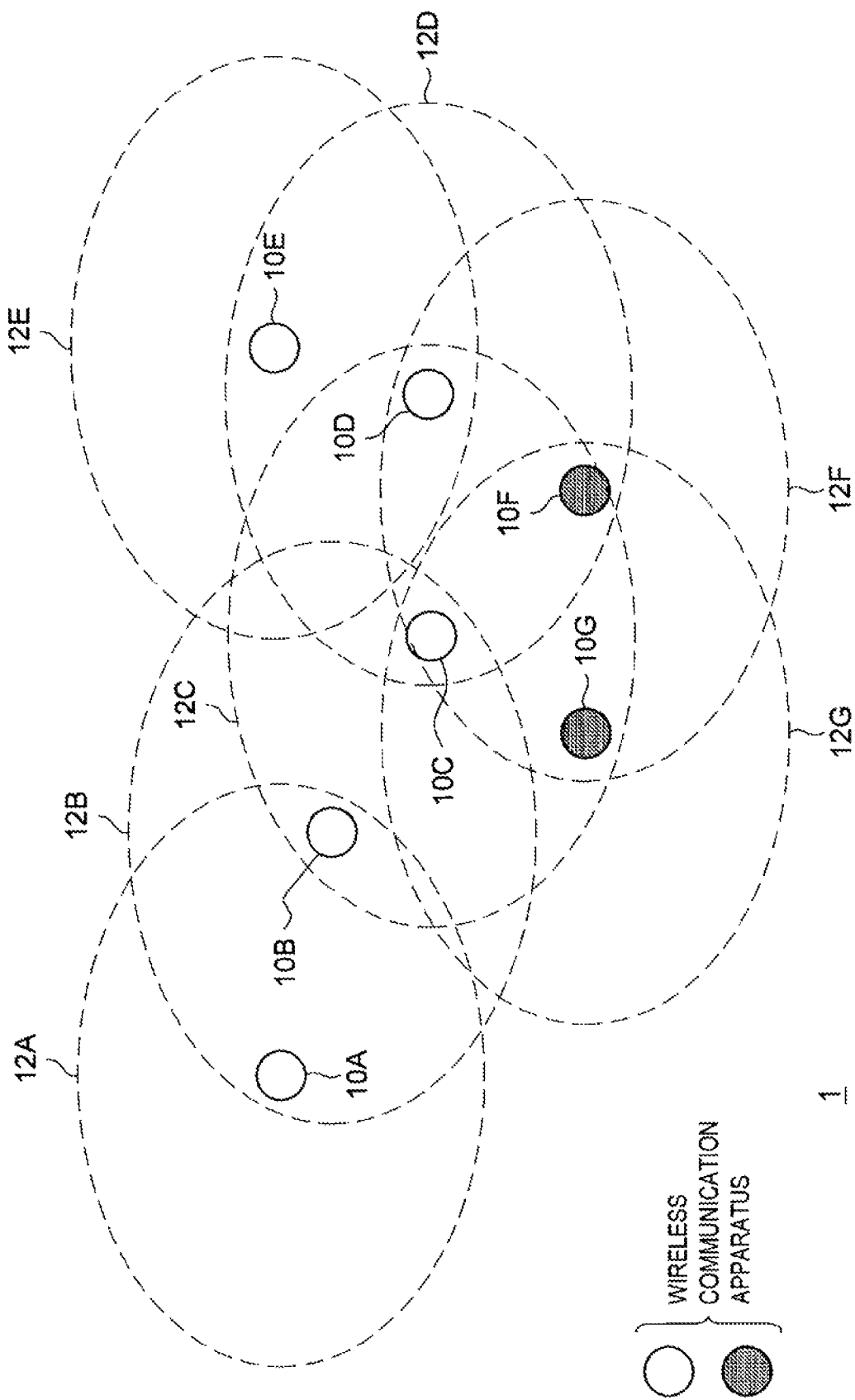
FIG. 1 is an explanatory figure that shows an example of the configuration of an autonomous distributed wireless network.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification, first, the configuration of an autonomous distributed wireless network and a communication mode of the autonomous distributed wireless network will be explained with reference to FIGS. 1 to 7. Then, the structure and operation of a wireless communication apparatus according to the present embodiment that forms a part of the autonomous distributed wireless network will be explained with reference to FIGS. 8 to 15.

FIG. 1 is an explanatory figure that shows the configuration of autonomous distributed wireless network group 1. The white circles in FIG. 1 indicate wireless communication apparatuses 10A to 10E that use the same channel for wireless communication, and the regions surrounded by dashed lines indicate radio wave ranges 12A to 12E in which each wireless communication apparatus 10 can communicate. In addition, the black circles indicate wireless communication apparatuses 10F and 10G that use a channel that is different to that of the wireless communication apparatuses 10A to 10E to perform wireless communication, and the regions surrounded by dashed lines indicate radio wave ranges 12F and 12G in which each wireless communication apparatus 10F and 10G can communicate. As can be seen, in the wireless network group 1, the radio wave ranges of the wireless communication apparatuses 10 that perform wireless communication using different channels overlap.

More specifically, the wireless communication apparatus 10A can communicate with the wireless communication apparatus 10B that is within the radio wave range 12A. The wireless communication apparatus 10B can communicate with the wireless communication apparatus 10A and the wireless communication apparatus 10C that are within the radio wave range 12B. Similarly, the wireless communication apparatus 10C can communicate with the wireless communication apparatus 10B and the wireless communication apparatus 10D, the wireless communication apparatus 10D can communicate with the wireless communication apparatus 10C and the wireless communication apparatus 10E, and the wireless communication apparatus 10E can communicate with the wireless communication apparatus 10D. In this manner, the wireless communication apparatuses 10A to 10E can communicate with the other communication devices within the respective radio wave ranges, thereby forming a wireless network in a wireless communication system.

In addition, because the wireless communication apparatus 10F is within the radio wave range 12G of the wireless communication apparatus 10G, and the wireless communication apparatus 10G is within the radio wave range 12F of the wireless communication apparatus 10F, the wireless communication apparatus 10F and the wireless communication apparatus 10G can communicate with each other. In this way, the wireless communication apparatus 10F and the wireless communication apparatus 10G form a wireless network in a wireless communication system.

Note that, because the wireless communication apparatus 10C is within the radio wave range 12F and 12G of the wireless communication apparatus 10F and the wireless communication apparatus 10G that operate using a different channel, the wireless communication apparatus 10C can set an acquisition channel, described hereinafter, to the channel used for wireless communication by the wireless communication apparatus 10F and the wireless communication apparatus 10G to determine the presence of the wireless communication apparatus 10F and the wireless communication apparatus 10G.

Note that, in the explanation hereinafter, when it is not necessary to specifically distinguish between the wireless communication apparatuses 10A to 10G, the term wireless communication apparatuses 10 alone will be used. Further, when it is not necessary to specifically distinguish between the radio wave ranges 12A to 12G, the term radio wave ranges 12 will be used.

The wireless communication apparatuses 10 may be any information process device such as a personal computer (PC), a household image processing device (a DVD recorder, a video deck or the like), a mobile phone, a personal handyphone system (PHS), a mobile music replay device, a mobile image processing device, a personal digital assistant (PDA), a household game console, a mobile game machine, a household appliance, or the like.

The description above completes the explanation of the example of the configuration of the autonomous distributed wireless network group 1. Next, a super frame for time division control of each wireless network will be explained with reference to FIG. 2.

Figure 2:
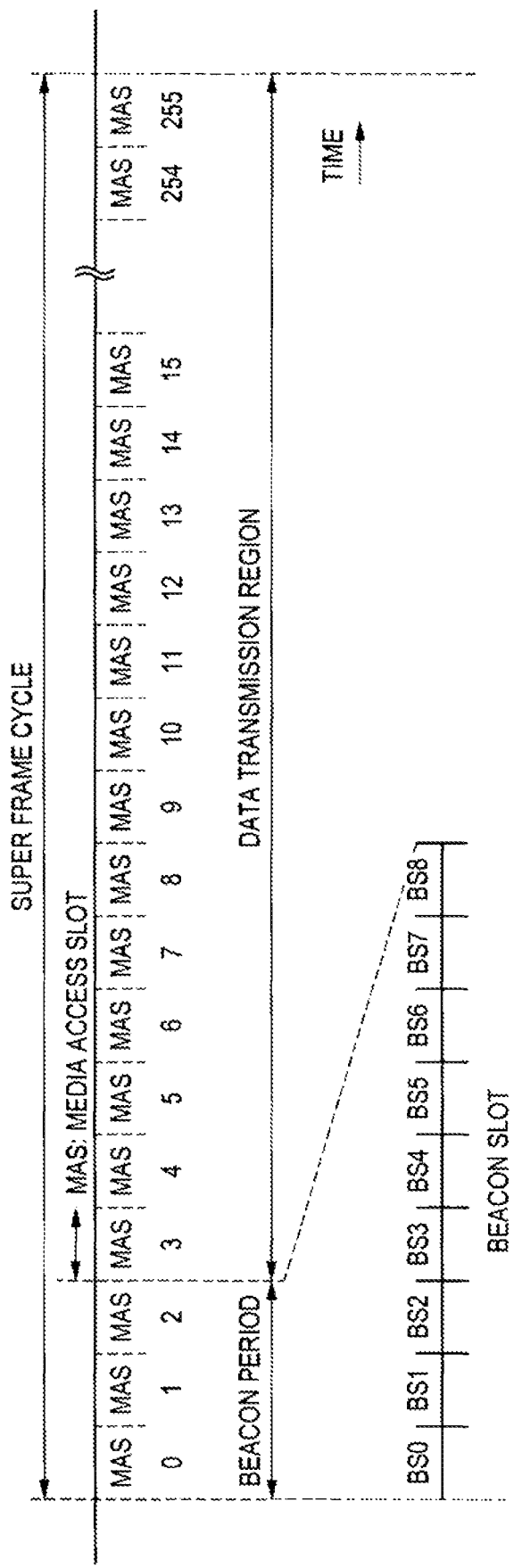
FIG. 2 is an explanatory figure that shows an example of the configuration of a super frame.

FIG. 2 is an explanatory figure that shows an example of the configuration of the super frame. The super frame cycle is defined by a determined time (for example, 65 ms), and is divided into 256 media access slots (MAS). The wireless communication apparatuses 10 that form one wireless network share the super frame cycle as a specified period frame, and the divided MAS are used as units to transfer messages.

In addition, there is a beacon period (BP) that serves as a management domain for transmitting and receiving management information using a beacon (a beacon signal) at the head of the super frame, and beacon slots (BS) are arranged at specified intervals. Each wireless communication apparatus 10 is set with a specified beacon slot, and can exchange parameters for performing network management or access control with wireless communication apparatuses 10 in the vicinity. FIG. 2 shows an example in which 9 beacon slots are set, namely, BS0 to BS8, as the beacon period. Note that, the period that is not set as the beacon period is normally used as a data transmission region.

Figure 3:
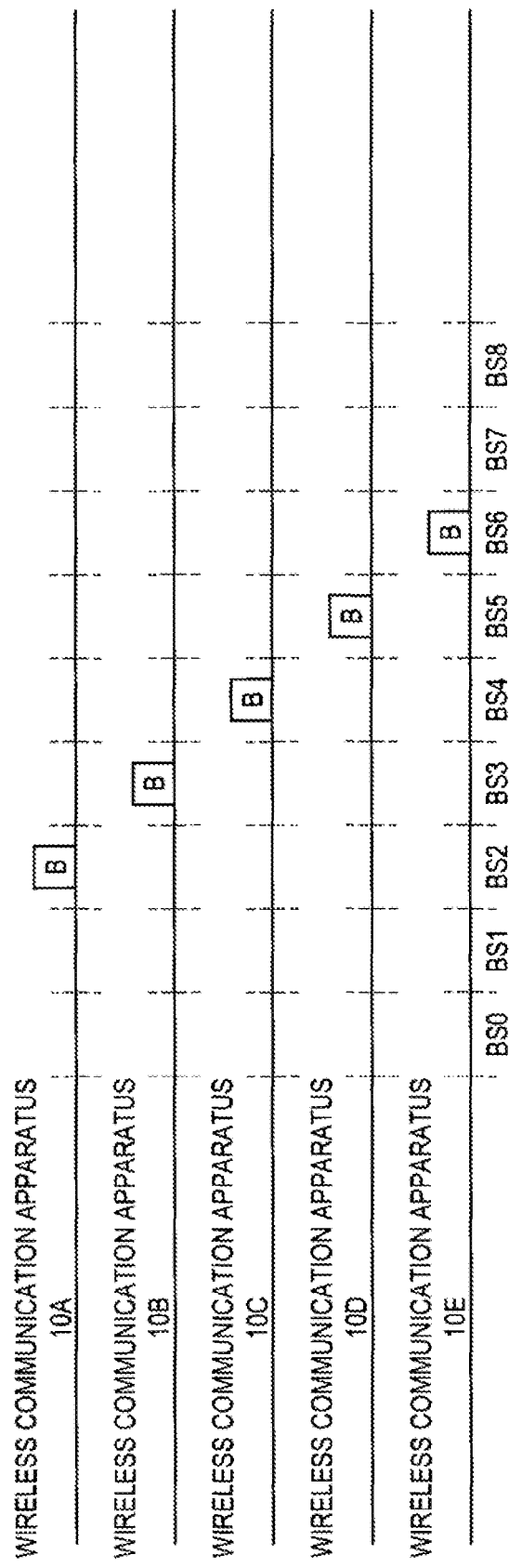
FIG. 3 is a conceptual diagram showing respective beacon slot positions that are set by each wireless communication apparatus for itself.

FIG. 3 is a conceptual diagram showing beacon slot positions that are set by each wireless communication apparatus 10 for itself in the case that the wireless communication apparatus 10A to the wireless communication apparatus 10E form a wireless network. FIG. 3 shows a state where, after all of the wireless communication apparatuses 10 that form one wireless network have notified each other about un-occupied beacon slots, each wireless communication apparatus 10 has selected the beacon slot it is going to use.

In this example, the wireless communication apparatus 10A transmits its beacon using BS2, the wireless communication apparatus 10B transmits its beacon using BS3. Similarly, the wireless communication apparatus 10C transmits its beacon using BS4, and the wireless communication apparatus 10D transmits its beacon using BS5. The wireless communication apparatus 10E transmits its beacon using BS6. In this manner, FIG. 3 shows a state where each wireless communication apparatus 10 exclusively uses a specific beacon slot, and is transmitting a beacon.

Note that, in order that a wireless communication apparatus 10H or the like can newly join the wireless network, BS0, BS1, BS7, and BS8 can be reserved as necessary. Normally, a specified number of free beacon slots are provided after the beacon slot of each wireless communication apparatus 10. The free beacon slots are provided in case one of the wireless communication apparatuses 10 newly joins the wireless network. In addition, the configuration is such that the beacon period of each wireless communication apparatus 10 can be appropriately extended in accordance with the beacon of the wireless communication apparatuses 10 in the vicinity.

Next, the channel used by the wireless communication apparatuses 10 for wireless communication will be explained with reference to FIGS. 4 and 5.

Figure 4:
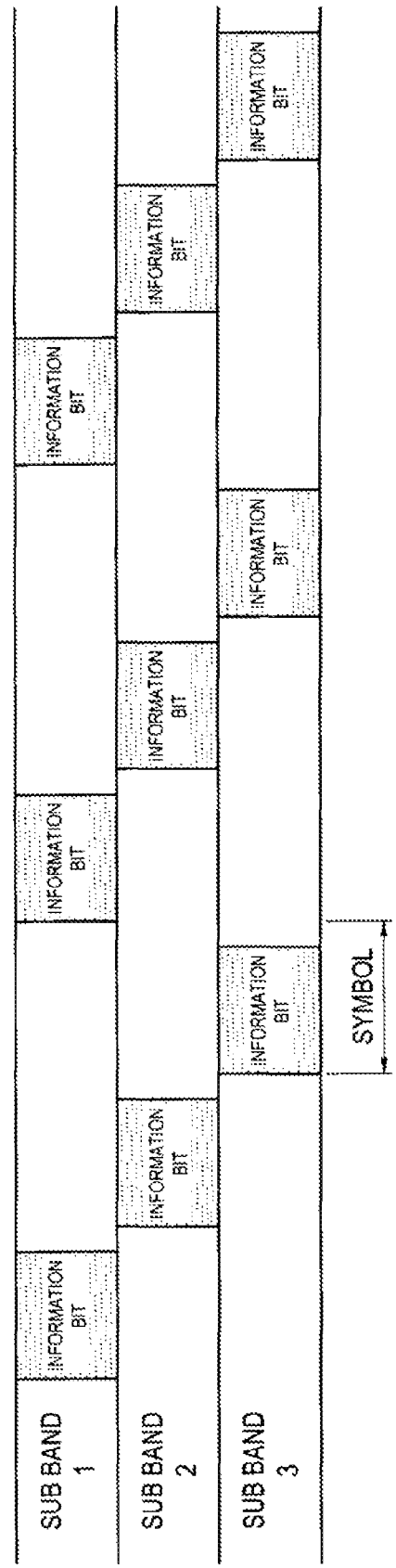
FIG. 4 is an explanatory figure that shows an example of a channel in which frequency hopping is performed.

FIG. 4 is an explanatory figure that shows an example of a channel in which frequency hopping is performed. More specifically, an example is shown of sub band frequency hopping in a wireless communication system based on multi band OFDM ultra wide band standards.

More particularly, an information bit is transmitted during a specified symbol in sub band 1, then, an information bit is transmitted during a specified symbol in sub band 2, and then an information bit is transmitted during a specified symbol in sub band 3. This operation is repeated to continuously transmit information.

FIG. 5 is an explanatory figure that shows an example of a frequency hopping pattern of the channel for wireless communication.

The frequency hopping pattern is defined by a channel code called TFC. For example, for the channel TFC : 1, the sub band that is used is changed in accordance with the rule sub band 1, sub band 2, sub band 3, sub band 1, sub band 2, sub band 3. The frequency hopping performed in channel 1 is as shown in FIG. 4.

For the channel TFC : 2, the sub band that is used is changed in accordance with the rule sub band 1, sub band 3, sub band 2, sub band 1, sub band 3, sub band 2.

In addition, for the channel TFC : 3, the sub band that is used is changed in accordance with the rule sub band 1, sub band 1, sub band 2, sub band 2, sub band 3, sub band 3. Similarly, for the channel TFC : 4, the sub band that is used is changed in accordance with the rule sub band 1, sub band 1, sub band 3, sub band 3, sub band 2, sub band 2.

In the multi band OFDM, patterns in which no frequency hopping is performed are pre-provided such as channels TFC : 5 to 7.

More specifically, TFC : 5 continuously uses sub band 1, TFC : 6 continuously uses sub band 2, and TFC : 7 continuously uses sub band 3. In this manner, the used frequency hopping pattern is determined in accordance with the set TFC code.

A specified preamble sequence is pre-provided that corresponds with each TFC code in the used TFC code. The preamble is a synchronization signal that is attached to the signal that is transmitted/received.

More particularly, in the case that TFC : 1 is set as the frequency hopping pattern, the sequence 1 can be used, in the case that TFC : 2 is set as the frequency hopping pattern, the sequence 2 can be used, in the case that TFC : 3 is set as the frequency hopping pattern, the sequence 3 can be used x, in the case that TFC : 4 is set as the frequency hopping pattern, the sequence 4 can be used, in the case that TFC : 5 is set as the frequency hopping pattern, the sequence 5 can be used, in the case that TFC : 6 is set as the frequency hopping pattern, the sequence 6 can be used, and in the case that TFC : 7 is set as the frequency hopping pattern, the sequence 7 can be used.

This completes the explanation of the channels used for wireless communication by the wireless communication apparatuses 10. Next, the configuration of a beacon frame that is transmitted and received In the beacon period by the wireless communication apparatuses 10 will be explained with reference to FIGS. 6 and 7.

FIG. 6 is an explanatory figure showing the configuration of a beacon frame 20. The beacon frame 20 includes specified management information such as MAC header information 21, a header check sequence (HCS) 22, a beacon parameter 23, an (first) information element 24, an (second) information element 25, an (Nth) information element 26, and a frame check sequence (FCS) 28.

In addition, the MAC header information 21 includes frame control information 211, destination address information 212 that identifies the wireless communication apparatus that is to receive the beacon frame 20, transmission source address 213 that identifies the wireless communication apparatus that is the transmission source of the beacon frame 20, sequence control information 214 such as a sequence number, and access control information 215 that details parameters that are necessary in access control.

Furthermore, the beacon parameter 23 includes a device identifier 231 that details MAC address information of the wireless communication apparatus 10 and the like, a beacon slot number 232 that indicates the beacon slot that is being used to transmit the beacon of the given wireless communication apparatus, and device control information 233 that includes unique characteristic information of the wireless communication apparatus 10.

Moreover, chosen information elements may be attached to the beacon frame 20 as beacon payload information. The (first) information element 24, the (second) information element 25, and the (Nth) information element 26 shown in FIG. 6 are an example of such information elements. The "N" of the "Nth" information element mentioned above indicates the number of information elements that are attached to the beacon and transmitted. The number "N" of the information elements may be different for each transmitted beacon.

Note that, each type of parameter described above may be added or removed as necessary from the configuration of the beacon frame 20.

FIGS. 7A to 7D are explanatory figures that show examples of information elements. More specifically, FIG. 7A is an explanatory figure that shows a beacon period occupancy information element 240, FIG. 7B shows a channel change information element 250, FIG. 7C shows a distributed reservation protocol information element 260, and FIG. 7D shows a beacon period switching information element 270.

As can be seen from FIG. 7A, the beacon period occupancy information element 240 is configured by an element identifier 241 that is unique to the beacon period occupancy information element 240, information length 242 that indicates the length of the information of the beacon period occupancy information element 240, beacon period length 243 that is set by the given wireless communication apparatus, a beacon slot information bit map 244 that provides notification about all of the beacon slots in which receiving took place in the previous super frame cycle, a (first) device address 245 that indicates the address of the wireless communication apparatus 10 that is the transmission source of the received beacon, and a (Nth) device address 246.

As can be seen from FIG. 7B, the channel change information element 250 is configured by an element identifier 251 that is unique to the channel change information element 250, information length 252 that indicates the length of the information of the channel change information element 250, a channel change count down 253 that indicates the time until the channel is to be changed (supper frame number), and a new channel number 254 that indicates the channel that is to be used after changing. For example, a count value detailed in the channel change countdown 253 may reduce by "1" each time a super frame cycle elapses, and when the count value reaches "0", the channel may be changed.

As can be seen from FIG. 7C, the distributed reservation protocol information element 260 that serves as time slot reservation information is configured by an element identifier 261 that is unique to the distributed reservation protocol information element 260, information length 262 that indicates the length of the information of the distributed reservation protocol information element 260, distributed reservation control information 263 that indicates parameters for reservation control using a specified protocol, target device address information 264 serving as device identifying information that indicates address information for another wireless communication apparatus that is the target for reservation, (first) distributed reservation allocation 265 that indicates the slot that is actually used for reservation with the other wireless communication apparatus that is the target for reservation, and (Nth) distributed reservation allocation 266.

The distributed reservation protocol information element 260 with the above-described configuration notifies wireless communication apparatuses 10 in the vicinity about reservation of use of a time slot (MAS), and is used to perform access control with wireless communication apparatuses 10 in the vicinity. In addition, in the case that there is a plurality of wireless communication apparatuses 10 that are communication targets, the distributed reservation protocol information element 260 is generated for each wireless communication apparatus 10.

As shown in FIG. 7D, the beacon period switching information element 270 includes an element identifier 271 that is unique to the beacon period switching information element 270, information length 272 that indicates the length of the information of the beacon period switching information element 270, a beacon move count down 273 that each time counts down the super frame number at which the beacon period is actually moved, a change slot offset 274 that indicates the beacon slot which is going to be used after the beacon period is moved, and a change BPST offset 275 that indicates an offset of a position of a BPST that is the start of a beacon period which is the beacon period that has been moved to and a BPST in the network that the current wireless communication apparatus belongs to.

In the case that a wireless network exists that operates using the same channel but has a different beacon period, the beacon period switching information element 270 with the above-described configuration is used when the wireless communication apparatus 10 belonging to one of the wireless networks provides notification about changing its beacon period to the beacon period used in the other wireless network.

This completes the explanation of the configuration of the beacon frame transmitted and received by the wireless communication apparatuses 10 during the beacon period with reference to FIGS. 6 and 7. Next, the structure and operation of the wireless communication apparatuses 10 according to the present embodiment will be explained with reference to FIGS. 8 to 15.

Figure 8:
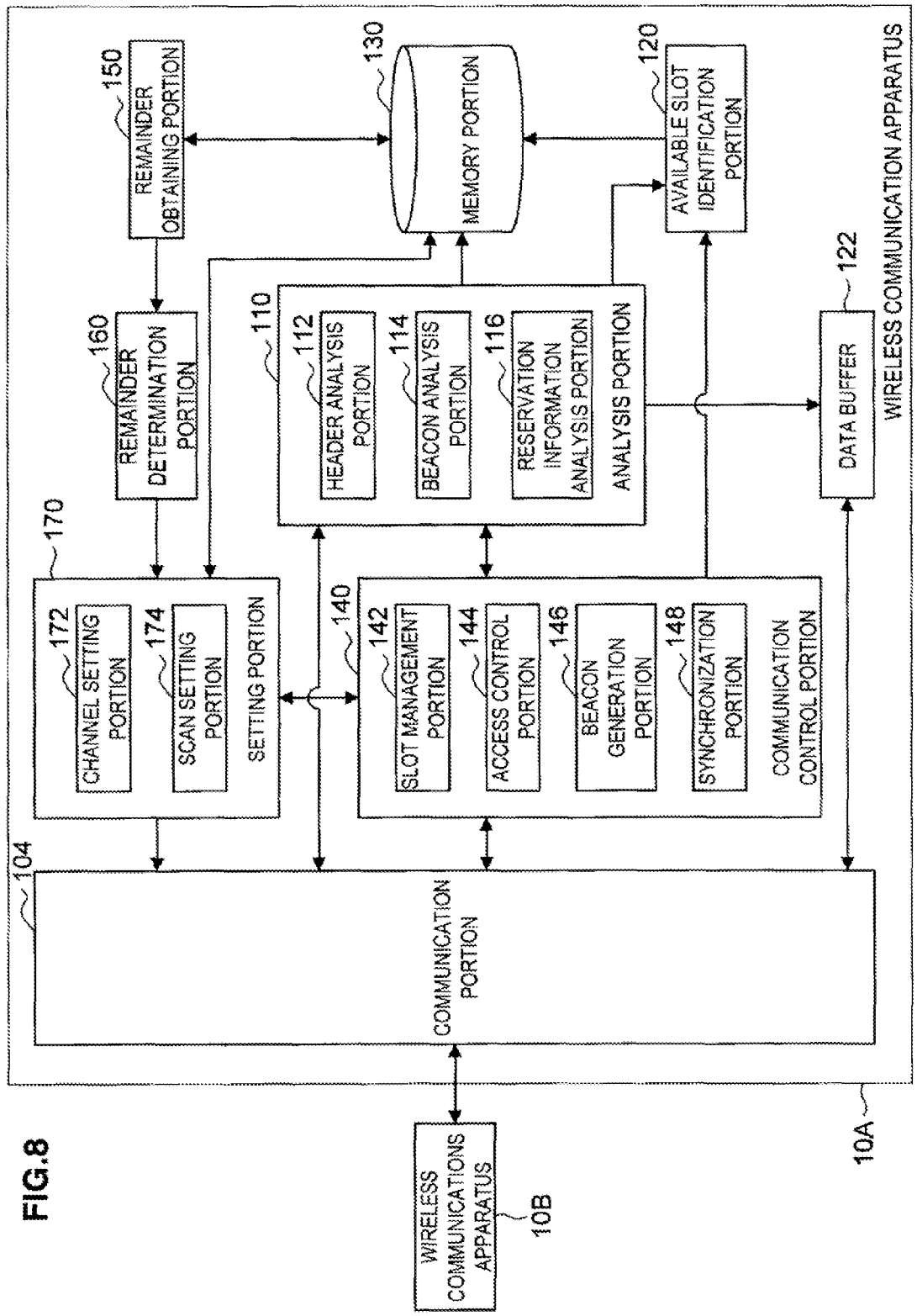
FIG. 8 is a function block diagram that shows the configuration of a wireless communication apparatus.

FIG. 8 is a function block diagram that shows the structure of the wireless communication apparatus 10A according to the present embodiment. The wireless communication apparatus 10A includes a communication portion 104, an analysis portion 110, an available slot identification portion 120, a data buffer 122, a memory portion 130, a communication control portion 140, a remainder obtaining portion 150, a remainder determination portion 160, and a setting portion 170.

The communication portion 104 is an interface with the other wireless communication apparatuses 10 like the wireless communication apparatus 10B and the wireless communication apparatus 10C, and has the functions of a transmission portion and a receiving portion. Furthermore, the communication portion 104 also has the function of an acquiring portion that scans a signal transmitted using the acquisition channel set by a channel setting portion 172. More specifically, the communication portion 104 may be provided with an antenna, a high frequency wireless processing portion and the like. The antenna transmits a specified high frequency signal using a wireless media and receives a specified high frequency signal using the wireless media. The high frequency wireless processing portion amplifies the high frequency signal received by the antenna and converts it to a received signal, and amplifies a transmitted signal and converts it to the high frequency signal. The communication portion 104 may be configured by a hardware resource or using software. Furthermore, the communication portion 104 may be configured to include a function as an interface that connects with other application devices.

The analysis portion 110 includes a header analysis portion 112, a beacon analysis portion 114, and a reservation information analysis portion 116, and analyses the signal received through the communication portion 104 by the wireless communication apparatus 10A.

The header analysis portion 112 analyses header information (for example, the MAC header information 21 shown in FIG. 6) detailed in the signal received through the communication portion 104 by the wireless communication apparatus 10A, and can analyze whether or not the received signal is a beacon.

The beacon analysis portion 114 analyses information detailed in signals that have been analyzed to be beacons by the header analysis portion 112. For example, the beacon analysis portion 114 may analyze the content detailed in the beacon parameter 23, the (first) information element 24 and the like as shown in FIG. 6.

The reservation information analysis portion 116 extracts the distributed reservation protocol information element 260 from the signal that has been analyzed to be a beacon by the header analysis portion 112. Then, based on the distributed reservation protocol information element 260 included in the beacon received from the wireless communication apparatus 10B, the wireless communication apparatus 10C or the like that form part of the same wireless network, the reservation information analysis portion 116 memorizes in the memory portion 130 distributed reservation protocol information for the network to which the wireless communication apparatus 10A belongs. In addition, based on the distributed reservation protocol information element 260 extracted during a scan, described hereinafter, the reservation information analysis portion 116 memorizes in the memory portion 130 the distributed reservation protocol information for each network that has been subject to a scan.

The available slot identification portion 120 determines the slot (MAS) position of frames other than beacons that have been received during the scan, described hereinafter, and determines whether or not each slot is available for use. Then, the available slot identification portion 120 memorizes in the memory portion 130 the availability for use of each slot in the network units that has been subject to a scan.

In the case that a data signal received through the communication portion 104 by the wireless communication apparatus 10A is addressed to the wireless communication apparatus 10A, the data buffer 122 stores pay load information other than the header section. Note that, the data signal may be transmitted and received in the data transmission region shown in FIG. 2.

The memory portion 130 memorizes the distributed reservation protocol information for the network that the wireless communication apparatus 10A belongs to based on the analysis of the beacons by the reservation information analysis portion 116, the distributed reservation protocol information for each network that has been subject to a scan based on the analysis of the beacons by the reservation information analysis portion 116, and the availability for use of each slot for each network unit that has been subject to a scan based on the determination of the available slot identification portion 120. An example of the content of the data memorized by the memory portion 130 will be described later with reference to FIG. 13.

Note that, the data buffer 122 and the memory portion 130 may be configured using the same hardware resource. In addition, the data buffer 122 or the memory portion 180 may be a storage medium such as, for example, a non-volatile memory such as an electrically erasable programmable read-only memory (EEPROM), an erasable programmable read-only memory (EPROM), or the like, a magnetic disk such as a hard disk, a magnetic material disk, or the like, an optical disc such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a Blu-ray™ disc rewritable (BD-RE), or the like, or a magneto-optical (MO) disk.

The communication control portion 140 controls overall wireless communication with the other wireless communication apparatuses 10 such as the wireless communication apparatus 10B and the wireless communication apparatus 10C, and includes a slot management portion 142, an access control portion 144, a beacon generation portion 146, and a synchronization portion 148.

The slot management portion 142 reserves slots for the wireless communication apparatus 10A or changes the slots so that there is no overlap between the slots reserved by the wireless communication apparatus 10A, and the other wireless communication apparatuses 10 in the wireless network that the wireless communication apparatus 10A belongs to such as the wireless communication apparatus 10B and the wireless communication apparatus 10C. Note that, herein below, reservation that is performed for wireless communication will be referred to by the name distributed reservation protocol (DRP).

The access control portion 144 has the function of a super frame access control portion that determines an access control method for each slot (MAS) in the super frame cycle based on the information detailed in the beacons, and manages operation.

The beacon generation portion 146 attaches slot reservation information that is reserved by the slot management portion 142 to the beacon frame and generates or sets the beacon. The synchronization portion 148 performs processing for synchronizing the BPST of the wireless communication apparatus 10A with a BPST in another network. In other words, the synchronization portion 148 can synchronize the super frame cycle of the wireless communication apparatus 10A with the super frame cycles in another network.

The remainder obtaining portion 150 obtains the remainding number of slots that can be reserved for wireless communication in the network based on the distributed reservation protocol information in the network that the wireless communication apparatus 10A belongs to. In the case that the remaining number of slots that can be reserved for wireless communication is stored in the memory portion 130, the remainder obtaining portion 150 has the function of a reading portion that reads the remaining number of slots from the memory portion 130. Alternatively, the remainder obtaining portion 150 may be configured to directly obtain from the reservation information analysis portion 116 the distributed reservation protocol information in the network that the wireless communication apparatus 10A belongs to.

Note that, the remaining number of slots obtained from the remainder obtaining portion 150 is just one example of a remaining time that can be reserved for wireless communication in the network that the wireless communication apparatus 10A belongs to. For example, instead of using slot units for the time division control system of the network, a configuration may be adopted in which the wireless communication apparatus 10 individually specifies time slots, and the remainder obtaining portion 150 obtains the remaining time as the amount of time that is not specified as time slots.

The remainder determination portion 160 determines whether or not the remaining number of slots (hereinafter referred to as "slot remaining number"), which has been obtained by the remainder obtaining portion 150 and which can be reserved for wireless communication in the network that the wireless communication apparatus 10A belongs to, is equal to or less than a scan start slot remaining number that is an acquisition reference remaining number. The remainder determination portion 160 also determines whether or not the slot remaining number is equal to or less than a channel change slot remaining number that is a change reference remaining number. Specific details of the determinations will be explained later. However, when the slot remaining number is determined by the remainder determination portion 160 to be equal to or less than the scan start slot remaining number, the wireless communication apparatus 10A attempts to obtain the usage state of channels that are different to the working channel that the wireless communication apparatus 10A is using for wireless communication. Further, when the slot remaining number is determined by the remainder determination portion 160 to be equal to or less than the channel change slot remaining number, the wireless communication apparatus 10A changes the working channel.

Note that, in the case that the configuration is such that the wireless communication apparatus 10A attempts to obtain the usage state of the channels that are different to the working channel when the slot remaining number is less than the specified number, the maximum slot remaining number when the slot remaining number is determined to be less than the specified number corresponds to the scan start slot remaining number. Moreover, in the case that the configuration is such that the wireless communication apparatus 10A changes the working channel when the slot remaining number is less than the specified number, the maximum slot remaining number when the slot remaining number is determined to be less than the specified number corresponds to the channel change slot remaining number.

The setting portion 170 includes a channel setting portion 172 and a scan setting portion 174. The channel setting portion 172 sets the working channel used for wireless communication with the wireless communication apparatus 10B, the wireless communication apparatus 10C etc. that form part of the same wireless network, and sets the acquisition channel used for scanning or acquiring the signals transmitted by the other wireless communication apparatuses 10F, 10G etc.

More specifically, it is sufficient that the working channel is the channel that is normally used for wireless communication with the wireless communication apparatus 10B, the wireless communication apparatus 10C etc. that form part of the same wireless network, and it is sufficient that the acquisition channel is the channel that is used for wireless communication by the wireless communication apparatus 10F, the wireless communication apparatus 10G etc. that form the other network. Thus, in the case that the acquisition channel is set by the channel setting portion 172 to the channel used by the wireless communication apparatus 10F, the wireless communication apparatus 10G etc. for wireless communication, it is possible for the wireless communication apparatus 10A to acquire or scan signals transmitted by the wireless communication apparatus 10F, the wireless communication apparatus 10G etc. More particularly, the communication portion 104 or the analysis portion 110 etc. has the function of an acquisition portion that receives, acquires or scans signals transmitted using the acquisition channel set by the channel setting portion 172.

In addition, when it is determined that the slot remaining number is the scan start slot remaining number by the determination portion 160, the channel setting portion 172 sets the acquisition channel, and causes the communication portion 104 etc. to scan the signals (beacon or data signals) transmitted using the set acquisition channel.

More specifically, when it is determined that the slot remaining number is the scan start slot remaining number by the remainder determination portion 160, the channel setting portion 172 can set the acquisition channel to a different channel for each super frame. As a result of adopting this configuration, the wireless communication apparatus 10A can scan the signals transmitted using different channels for each super frame, and thereby determine the usage state of each channel.

Furthermore, when it is determined that the slot remaining number is equal to or less than the channel change slot remaining number by the remainder determination portion 160, the channel setting portion 172 changes the working channel based on the results of the scan of the signals of the acquisition channel.

More particularly, the channel setting portion 172 uses the distributed reservation protocol information for each network that has been subject to a scan stored in the memory portion 130, the availability for use of each slot in the wireless networks units that have been subject to a scan, and the like, as a basis to change the working channel to a channel that is used by a wireless network that has more free slots. Moreover, if there is a channel that is not being used for wireless communication at all, the channel setting portion 172 may change the working channel to this channel. Alternatively, the channel setting portion 172 may change the working channel to the channel used in the wireless network that has the greatest number of free slots among the wireless networks that have been subject to a scan.

Note that, the scan start slot remaining number may be a number that corresponds with the type of the acquisition channel that is set by the channel setting portion 172. For example, if the number of types of the acquisition channel set by the channel setting portion 172 is large, a longer time is required for the communication portion 104 or the analysis portion 110 etc. functioning as the acquisition portion to scan the signals transmitted using the various acquisition channels from other wireless communication apparatuses 10. On the other hand, if the number of types of the acquisition channel set by the channel setting portion 172 is small, a shorter time is required for the communication portion 104 or the analysis portion 110 etc. functioning as the acquisition portion to scan the signals transmitted using the various acquisition channels from other wireless communication apparatuses 10. Further, when the slot remaining number has become equal to or less than the channel change slot remaining number, it is preferable that the scan of the signals transmitted using all of the acquisition channels set by the channel setting portion 172 is ended.

Given the above, a configuration may be adopted in which as the number of types of acquisition channel set by the channel setting portion 172 becomes larger, the scan start slot remaining number is set to a larger value, and as the number of types of acquisition channel set by the channel setting portion 172 becomes smaller, the scan start slot remaining number is set to a smaller value. As a result, it is possible to increase the probability that the scan of the signals transmitted using all of the acquisition channels set by the channel setting portion 172 will be completed by the time the slot remaining number becomes equal to or less than the channel change slot remaining number.

For example, in the case that there are 5 acquisition channels that can be set by the channel setting portion 172, the scan start slot remaining number is set to 14, and in the case that there are 20 acquisition channels that can be set by the channel setting portion 172, the scan start slot remaining number is set to 32, or the like. In this manner, a relationship between the acquisition channels that can be set by the channel setting portion 172 and the scan start slot remaining number may be defined in advance.

Moreover, the channel change slot remaining number may be a number that corresponds with the number of wireless communication apparatus 10 that form the same wireless network. In the case that the number of free slots for wireless communication in the network using the time division control system is large, there is a low probability that the slots that different wireless communication apparatuses 10 attempt to reserve for wireless communication will overlap. On the other hand, in the case that the number of free slots for wireless communication in the network using the time division control system is small, there is a high probability that the slots that different wireless communication apparatuses 10 attempt to reserve for wireless communication will overlap. Moreover, if the number of wireless communication apparatuses 10 that form the same wireless network is large, there is a higher probability that the number of wireless communication apparatuses 10 that attempt to reserve slots for wireless communication will increase. Assuming hypothetically that the slots that different wireless communication apparatuses 10 attempted to reserve for wireless communication did overlap, it is necessary to perform a troublesome adjustment process for the reserved slots among the wireless communication apparatuses 10.

Given the above, in the wireless communication apparatus 10 according to the present embodiment, as the number of wireless communication apparatuses 10 that form the same wireless network increases, the channel change slot remaining number is set to a larger value, and as the number of wireless communication apparatuses 10 that form the same wireless network decreases, the channel change slot remaining number is set to a smaller value. As a result of adopting this configuration, it is possible to change the probability that overlap will occur between the slots that different wireless communication apparatuses 10 attempt to reserve for wireless communication.

For example, a configuration may be adopted in which, in the case that the number of wireless communication apparatuses 10 that form the same network is 2, the channel change slot remaining number is set to 4, and in the case that the number of wireless communication apparatuses 10 that form the same wireless network is 12, the channel change slot remaining number is set to 14, or the like. In this manner, a relationship between the number of wireless communication apparatuses 10 that form the same wireless network and the scan start slot remaining number may be defined in advance.

The channel change slot remaining number may be a value that is based on the slot remaining number that can be used for wireless communication using each acquisition channel and that is estimated from the results of a scan using the acquisition channels. In the above-described structure, for example, if the average slot remaining number that can be used for wireless communication using each acquisition channel and that is estimated from the results of the scan using the acquisition channels is large, the channel change slot remaining number can be set to a large value. Accordingly, in the case that the wireless communication of the wireless network of a given wireless communication apparatus 10 is relatively crowded as compared to other wireless networks, the given wireless communication apparatus 10 can change its working channel to the working channel of the other wireless network, thereby evening out the wireless communication traffic of each wireless network.

For example, in the case that the average slot remaining number of the channels that have been scanned is 112, the channel change slot remaining number may be set to 112. Alternatively, the channel change slot remaining number may be set to the slot remaining number that is largest among the channels that have been scanned. More particularly, the channel change slot remaining number may be determined using the results of the scan in some form or other.

The scan setting portion 174 sets the scan operation for the wireless communication apparatus 10A. For example, the scan setting portion 174 can perform setting such that the scan operation is performed using slots that are not fundamentally used for wireless communication between the wireless communication apparatus 10A and the other wireless communication apparatus 10B, wireless communication apparatus 10C etc. that form part of the same wireless network. If this structure is adopted, the wireless communication apparatus 10A can perform fundamental wireless communication with the wireless communication apparatus 10A, the wireless communication apparatus 10B etc that form part of the same wireless network in parallel to scanning the signals using the acquisition channel. More specifically, the wireless communication apparatus 10A according to the present embodiment can scan the signals transmitted from the other wireless communication apparatus 10F, wireless communication apparatus 10G etc. without interfering with the fundamental wireless communication of the wireless communication apparatus 10A.

Hereinabove, the structure of the wireless communication apparatus 10 according to the present embodiment has been explained. The wireless communication apparatuses 10B to 10G have substantially the same structure as the wireless communication apparatus 10A, and thus an explanation of their structure will be omitted here. Note that, a computer program can also be created that causes hardware such as a CPU, a ROM, and a RAM that are built-in to the wireless communication apparatus 10A to perform functions that are the same as each structural element of the above-described wireless communication apparatuses 10. Next, the specific operations of the remainder obtaining portion 150, the remainder determination portion 160, the setting portion 170, and the like will be explained with reference to FIGS. 9 to 14.

Figure 9:
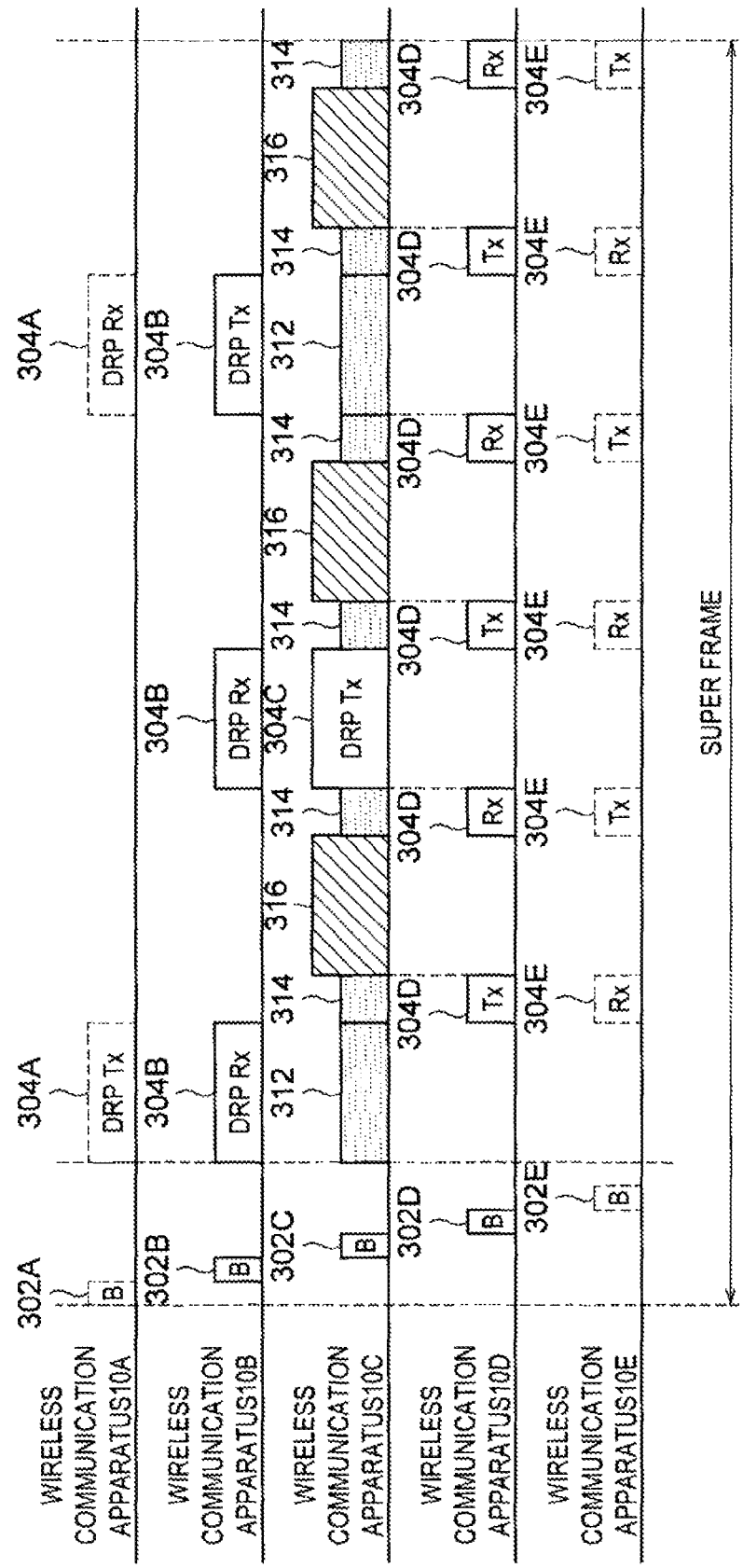
FIG. 9 is an explanatory figure that shows the state of a remaining number of slots that are available for reservation in the wireless communication apparatus.

FIG. 9 is an explanatory figure that shows the state of the remaining number of slots that are available for reservation in the wireless communication apparatus 10C. The wireless communication apparatus 10C, as shown in FIG. 1, receives a beacon 302B that is transmitted by the wireless communication apparatus 10B and a beacon 302D that is transmitted by the wireless communication apparatus 10D that are in the vicinity of the wireless communication apparatus 10C. Note that, because the working channel of the wireless communication apparatus 10B and the wireless communication apparatus 10D is the same as the working channel of the wireless communication apparatus 10C, the wireless communication apparatus 10C can receive the beacon 302B and the beacon 302D transmitted from the wireless communication apparatus 10B and the wireless communication apparatus 10D without having to specially perform a switching operation.

Based on the beacon 302B received from the wireless communication apparatus 10B, the wireless communication apparatus 10C can determine the slots for which a DRP reservation is set between the wireless communication apparatus 10B and the wireless communication apparatus 10A. For example, the wireless communication apparatus 10C can determine based on the beacon 302B received from the wireless communication apparatus 10B that slots indicated by DRP (Rx, Tx) 304A and DRP (Rx, Tx) 304B are already reserved. In addition, the wireless communication apparatus 10C can memorize in the memory portion 130 that the slots indicated by DRP (Rx, Tx) 304A and DRP (Rx, Tx) 304B are already reserved.

Moreover, the wireless communication apparatus 10C can determine, based on the beacon 302D received from the wireless communication apparatus 10D, the slots for which a DRP reservation is set between the wireless communication apparatus 10D and the wireless communication apparatus 10E. For example, the wireless communication apparatus 10C can determine based on the beacon 302D received from the wireless communication apparatus 10D that slots indicated by DRP (Rx, Tx) 304D and DRP (Rx, Tx) 304E are already reserved. In addition, the wireless communication apparatus 10C can memorize in the memory portion 130 that the slots indicated by DRP (Rx, Tx) 304D and DRP (Rx, Tx) 304E are already reserved.

As a result, the wireless communication apparatus 10C can determine that it is not possible to reserve an already reserved slot 312 that is reserved by the DRP (Rx, Tx) 304A and the DRP (Rx, Tx) 304B, an already reserved slot 314 that is reserved by the DRP (Rx, Tx) 304D and the DRP (Rx, Tx) 304E, and an already reserved slot that is reserved by a DRP (Tx) 304C for transmission by the wireless communication apparatus 10C.

Moreover, the wireless communication apparatus 10C can determine that there are reservable slots 316 that are the slots other than those described above which it has already determined are reserved. Furthermore, for example, the remainder obtaining portion 150 can obtain the number of the reservable slots 316 as the remaining number of slots obtained by subtracting the number of already reserved slots memorized in the memory portion 130 from the total number of slots.

Figure 10:
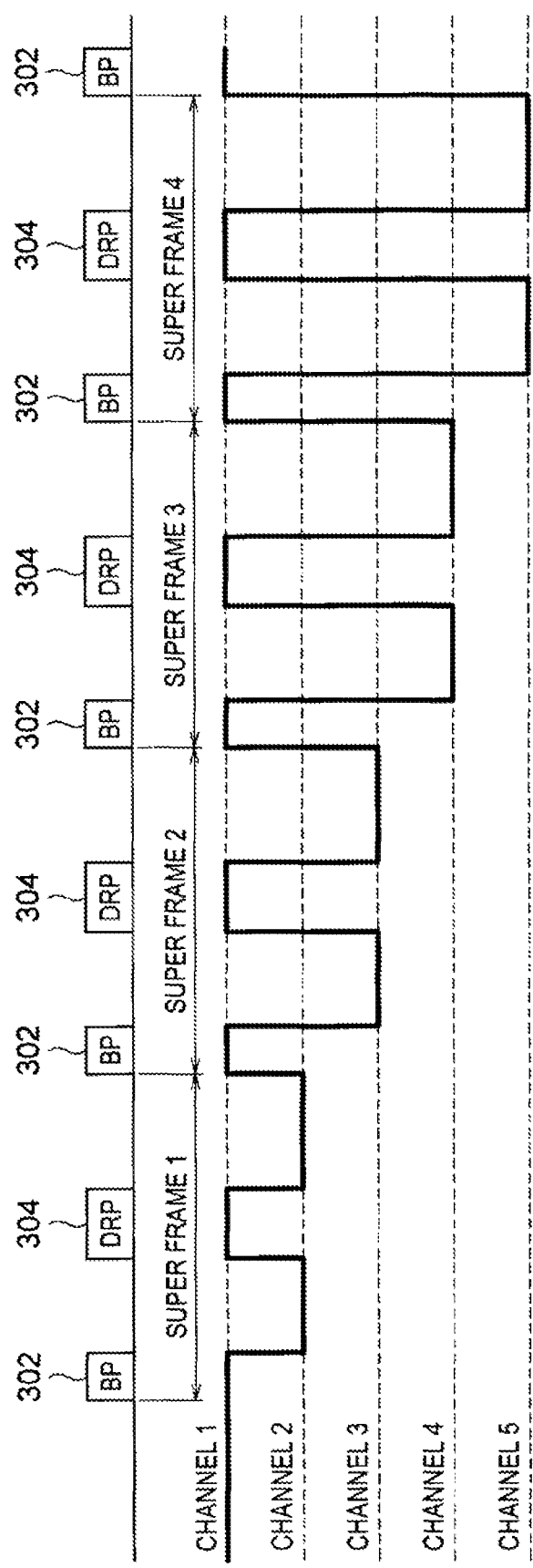
FIG. 10 is an explanatory figure that shows the state of a scan operation of the wireless communication apparatus of the present embodiment.

FIG. 10 is an explanatory figure that shows the state of a scan operation of the wireless communication apparatuses 10 according to the present embodiment. As can be seen in FIG. 10, each wireless communication apparatus 10 performs the scan operation for signals transmitted using channels that are different to the working channel of the given wireless communication apparatus 10 in the slots other than those of beacon periods (BP) 302, and slots 304 that are reserved by the given wireless communication apparatus 10.

For example, the given wireless communication apparatus 10 performs communication using channel 1 that is the working channel that the given wireless communication apparatus 10 fundamentally uses for wireless communication while setting the acquisition channel to channel 2 during the free time in super frame 1, namely, time other than the beacon period (BP) 302 and the slots 304 reserved by the given wireless communication apparatus 10. Then, the wireless communication apparatus 10 performs the scan operation for the signals transmitted using channel 2. Similarly, the given wireless communication apparatus 10 sets the acquisition channel to channel 3 during the free time in super frame 2, and performs the scan operation for signals transmitted using channel 3. Further, the given wireless communication apparatus 10 sets the acquisition channel to channel 4 during the free time in super frame 3, and performs the scan operation for signals transmitted using channel 4. The given wireless communication apparatus 10 then sets the acquisition channel to channel 5 during the free time in super frame 4, and performs the scan operation for signals transmitted using channel 5.

Note that, the scan operation of this type, as described above, is started when the slot remaining number determined by the remainder determination portion 160 is equal to or less than the scan start slot remaining number. Further, the scan operation may be ended when, for example, the working channel is changed by the channel setting portion 172 or when the slot remaining number becomes equal to or larger than the scan start slot remaining number.

Figure 11:
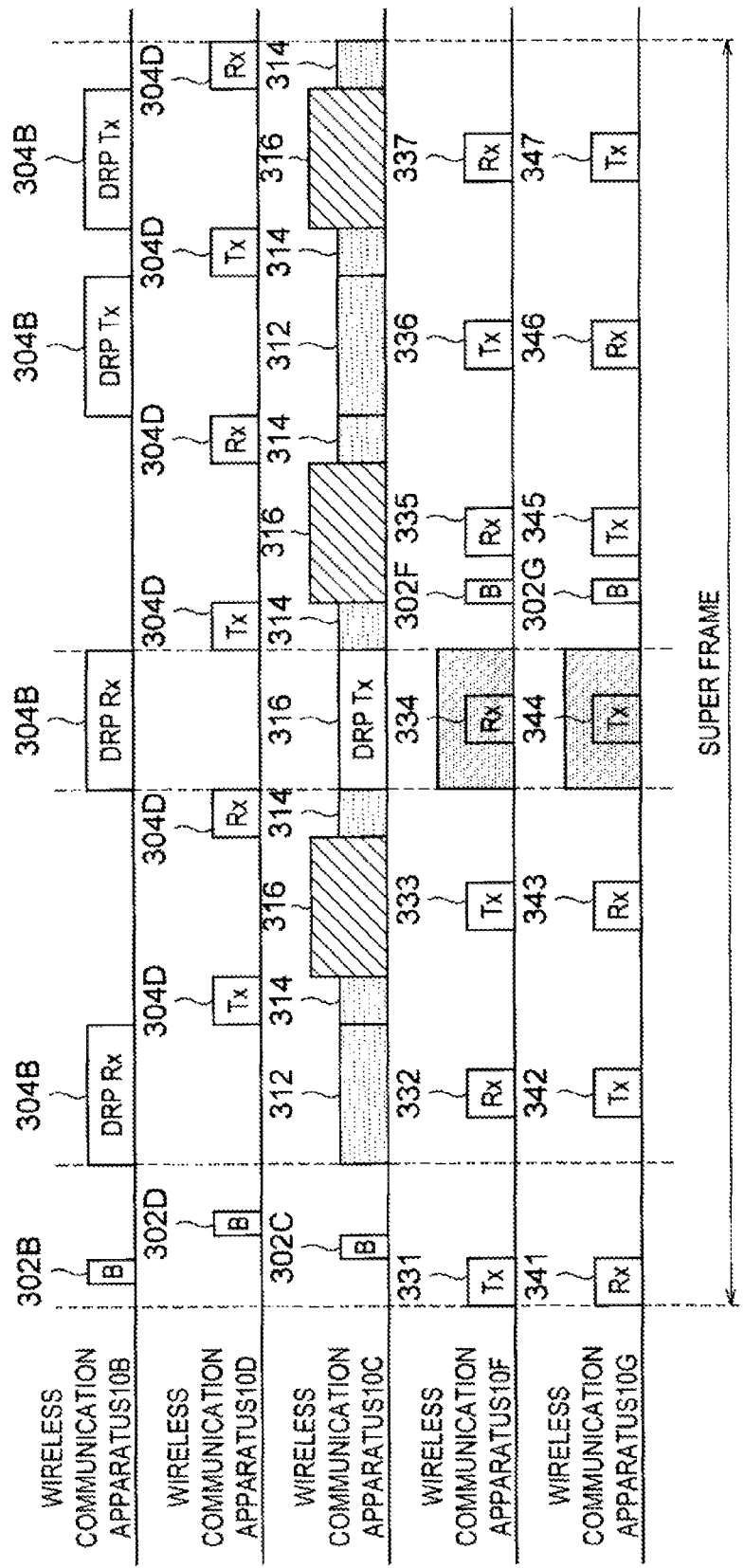
FIG. 11 is an explanatory figure that shows an example of the results of the scan operation of the wireless communication apparatus.
Figure 12:
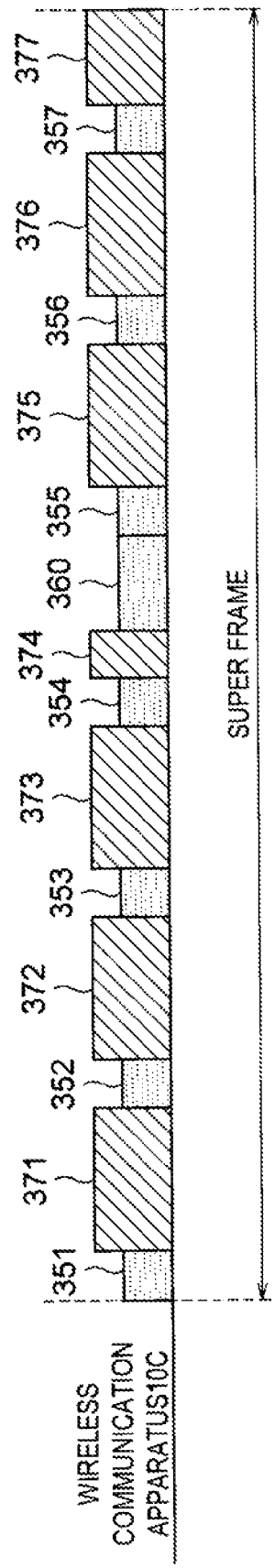
FIG. 12 is an explanatory figure that shows an example of the results of the scan operation of the wireless communication apparatus.

FIGS. 11 and 12 are explanatory figures that show examples of the results of a scan operation of the wireless communication apparatus 10C. As shown in FIG. 11, as a result of the scan operation, the wireless communication apparatus 10C can receive a beacon 302F transmitted by the wireless communication apparatus 10F. Thus, the wireless communication apparatus 10C can determine that the slots indicated by DRP (Rx, Tx) 331 to 337, 341 to 347 are already reserved slots that have been reserved by the wireless communication apparatus 10F and the wireless communication apparatus 10G. In addition, the wireless communication apparatus 10C can memorize the already reserved slots in the memory portion 130.

For example, in the case that the wireless communication apparatus 10F and the wireless communication apparatus 10G are using channel 2 as their working channel, the wireless communication apparatus 10C can determine the usage state of channel 2 shown in FIG. 12 based on the received beacon 302F. More particularly, the wireless communication apparatus 10C can determine that slots 351 to 357 that correspond to the DRP (Rx, Tx) 331 to 337, 341 to 347 reserved by the wireless communication apparatus 10F and the wireless communication apparatus 10G, and the beacon period 360 in the network that uses channel 2 are slots that cannot be used or are not reservable. As a result, the wireless communication apparatus 10C can determine that the slots other than the slots 351 to 357 and the beacon period 360 are reservable slots 371 to 377.

Note that, in the case that beacon 302F transmitted using the acquisition channel could not be received during the scan operation, it can be determined that the slots in which transmitted/received data signals are actually received are slots that cannot be used or cannot be reserved.

Figure 13:
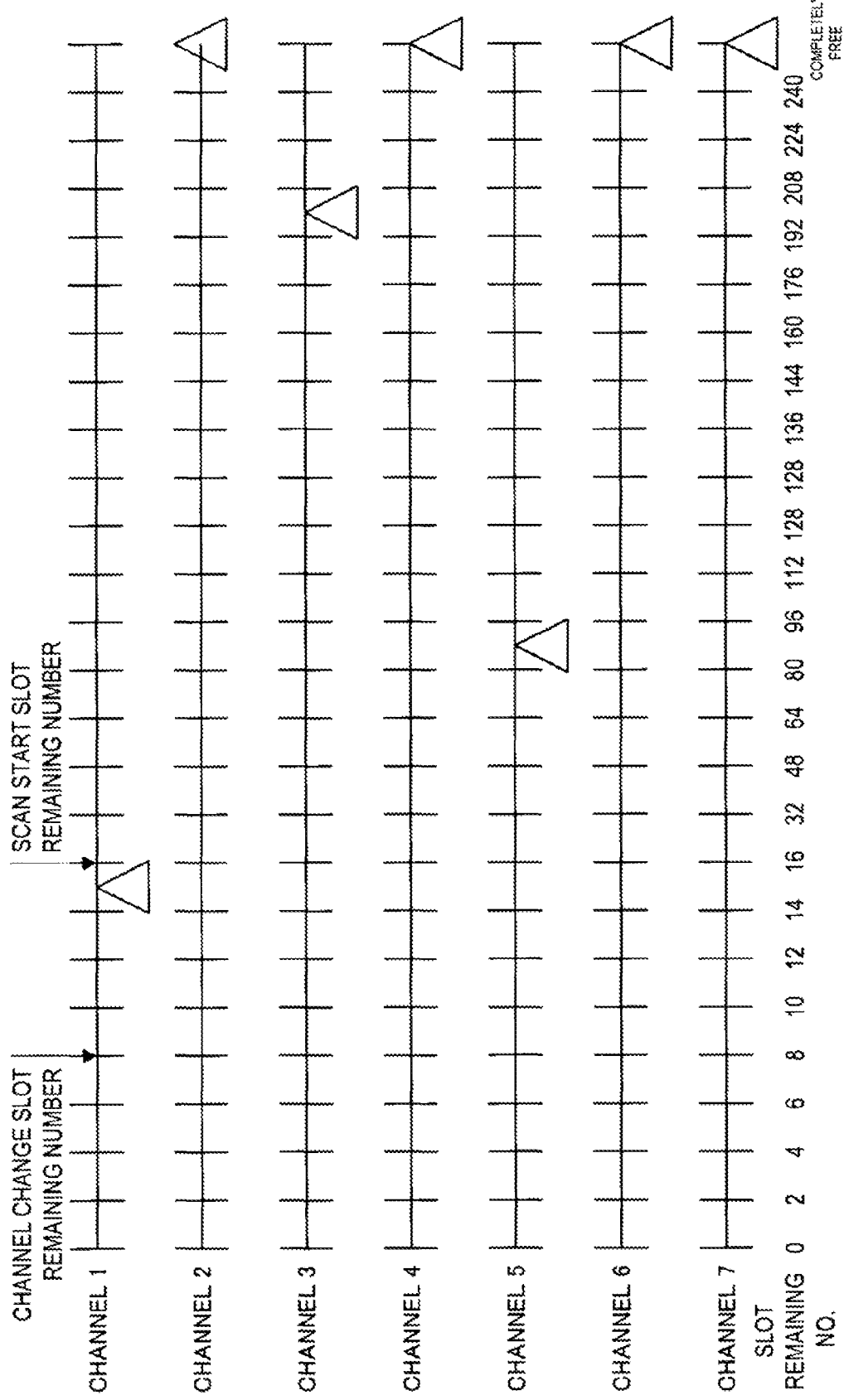
FIG. 13 is an explanatory figure that shows a concrete example of the remaining number of slots when a channel is changed and the remaining number of slots when a scan is started.

FIG. 13 is an explanatory figure that shows a concrete example of the channel change slot remaining number and the scan start slot remaining number. As shown in FIG. 13, the remainder determination portion 160 of the given wireless communication apparatus 10 according to the present embodiment determines, for example, that the slot remaining number in the working channel used by the given wireless communication apparatus 10 is 16 or less. In the case that the slot remaining number determined by the remainder determination portion 160 is 16 or less, the given wireless communication apparatus 10 performs the scan operation by using the channel setting portion 172 to sequentially set the acquisition channel. As shown in the example of FIG. 13, the slot remaining number in channel 1 is 15, and because this is less than 16, which is the scan start slot remaining number, the scan operation is started by the given wireless communication apparatus 10.

FIG. 13 shows an example in which the given wireless communication apparatus 10 scans channel 2, and determines that channel 2 is not being used for wireless communication. Accordingly, the fact that channel 2 is a free channel is memorized in the memory portion 130. Similarly, FIG. 13 shows a state where the given wireless communication apparatus 10 scans channel 3 and memorizes in the memory portion 130 that the slot remaining number in channel 3 is between 192 and 208, scans channel 4 and memorizes in the memory portion 130 that channel 4 is a free channel, scans channel 5 and memorizes in the memory portion 130 that the slot remaining number in channel 5 is between 80 and 96, scans channel 6 and memorizes in the memory portion 130 that channel 6 is a free channel, and scans channel 7 and memorizes in the memory portion 130 that channel 7 is a free channel.

In addition, in the case that the slot remaining number in channel 1 reduces and becomes equal to or less than 8 slots, which is the channel change slot remaining number, the channel setting portion 172 can use the results of the scan operation memorized in the memory portion 130 to select channel 3, which is the channel among the used channels with the largest slot remaining number, and change the working channel to channel 3.

Note that, the channel selected by the channel setting portion 172 may be a free channel or may be the channel among the used channels that has the smallest number of used slots. Further, channels that have a smaller number of remaining slots than the scan start slot remaining number may be excluded from the selection. In addition, the channel setting portion 172 may simply select the channel that has the lowest channel number, or may perform selection based on a plurality of conditions that are combined as necessary.

Figure 14:
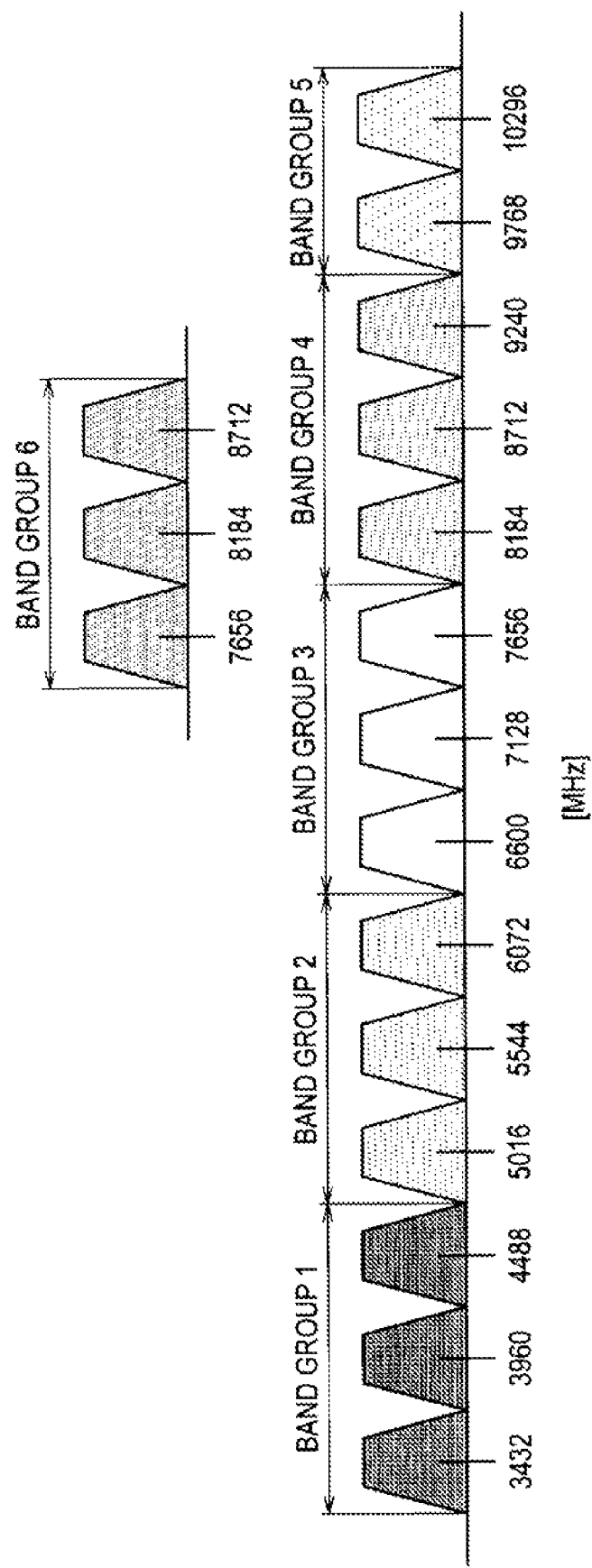
FIG. 14 is an explanatory figure that shows the configuration of a frequency channel in a multi band orthogonal frequency division multiplex (OFDM) system.

FIG. 14 is an explanatory figure that shows the configuration of a frequency channel in the multi band OFDM system. As shown in FIG. 14, in the Wimedia Alliance standard, it is defined that 14 sub bands, each with a 528 KHz band width, are allocated between 3.1 GHz and 10.6 GHz.

In addition, a band group 1, a band group 2, a band group 3, and a band group 4 are configured by delimiting groups of 3 sub bands in order from the low frequency sub bands. The remaining 2 sub bands configure a band group 5. Note that, at the present time, addition of a band group 6 that uses a frequency band that can be commonly internationally used is scheduled.

By changing the frequency hopping pattern for each band group described above, the channels 1 to 7 shown in FIG. 5 can be configured. More specifically, the channels 1 to 7 shown in FIG. 5 just show the channel of one band group.

Thus, in the case that the working channel is channel 7 of band group 1, the channel setting portion 172 may set the acquisition channel to channel 2 of band group 3, and following this may change the working channel to channel 2 of band group 3. Note that, the channels that can be set as the acquisition channel by the channel setting portion 172 may be limited or designated in advance.

This completes the explanation of the specific operation of the remainder determination portion 160, the setting portion 170 and the like. Next, the operation of the wireless communication apparatus 10 according to the present embodiment will be explained with reference to FIG. 15.

FIG. 15 is a flow chart that shows a wireless communication method of the wireless communication apparatus 10 according to the present embodiment. As shown in FIG. 15, first, the channel setting portion 172 of the wireless communication apparatus 10 sets the working channel for wireless communication in the wireless network that the given wireless communication apparatus 10 belongs to (step S402). Then, the remainder obtaining portion 150 obtains the number of free slots in the working channel used by the given wireless communication apparatus 10, namely, obtains the slot remaining number (step S403).

Next, the remainder determination portion 160 determines whether or not the slot remaining number obtained by the remainder obtaining portion 150 is equal to or less than the channel change slot remaining number (step S404). If the remainder determination portion 160 determines that the slot remaining number is not equal to or less than the channel change slot remaining number, the remainder determination portion 160 then determines whether or not the slot remaining number is equal to or less than the scan start slot remaining number (step S406). If the remainder determination portion 160 determines that the slot remaining number is not equal to or less than the scan start slot remaining number, the routine returns to the processing according to step S403. On the other hand, if the remainder determination portion 160 determines that the slot remaining number is equal to or less than the scan start slot remaining number, the channel setting portion 172 sets the acquisition channel (step S408). Then, the wireless communication apparatus 10 memorizes in the memory portion 130 the acquisition channel set by the channel setting portion 172 as a free channel.

Next, the scan setting portion 174 determines whether or not the present time is within a scan time range, namely, the present time is outside of the time in which fundamental wireless communication is performed using the working channel (step S412). If the present time is determined to be within the scan time range, the channel setting portion 172 switches the channel to the acquisition channel (step S414). Then, if the communication portion 104 receives any type of frame, the fact that the acquisition channel is a used channel is memorized in the memory portion 130 (steps S416, S418). Next, the available slot identification portion 120 causes the memory portion 130 to memorize the slots in which the communication portion 104 received frames as detected slot positions (step S420).

Moreover, the header analysis portion 112 analyses the header information of any of the frames received by the communication portion 104, and if any of the frames received by the communication portion 104 is a beacon frame, the beacon analysis portion 114 analyses the beacon parameter (step S422, step S424). In addition, based on the analysis of the beacon parameter obtained by the beacon analysis portion 114, the available slots in the acquisition channel are memorized in the memory portion 130 (step S426). Moreover, the head position of the super frame in the acquisition channel is also memorized in the memory portion 130 (step S428). After the processing of steps S412 to S428, or in the case that no frames are received, or in the case that the received frame is not a beacon frame, the routine returns to step S412, and it is determined whether or not the present time is in the scan time range.

In step S412, if it is determined that the present time is in the scan time range, namely, that the present time is a time when fundamental wireless communication is being performed using the working channel, the channel setting portion 172 switches the channel to the working channel (step S430). Next, if the super frame cycle ends, the routine returns to step S403, whereas if the super frame cycle has not ended, the routine returns to step S412 (step S432). In other words, if the scan time range is entered again before the super frame ends, the wireless communication apparatus 10 switches the channel to the acquisition channel and performs the scan operation.

On the other hand, in step S404, if it is determined by the remainder determination portion 160 that the slot remaining number is equal to or less than the channel change slot remaining number, the channel setting portion 172 determines based on the scan results whether or not there are any channels memorized in the memory portion 130 as free channels (step S434). If the channel setting portion 172 determines that there are channels memorized in the memory portion 130 as free channels, the channel setting portion 172 changes the working channel to the free channel.

In step S434, if it is determined that there are no channels memorized in the memory portion 130 as free channels, the channel setting portion 172 obtains the slot remaining number (the number of available slots) for each channel that is memorized in the memory portion 130 (step S436). Then, if the slot remaining number obtained in step S436 is greater than the number of usage slots that the green wireless communication apparatus 10 is going to reserve for use, the synchronization portion 148 changes a beacon transmission position in the given channel to the beacon transmission position of the given wireless communication apparatus 10 (step S454), and the channel setting portion 172 changes the working channel to the given channel (steps S438, S456). Note that, a configuration may be adopted in which, in step S438, if the slot remaining number obtained in step S436 is larger than the slot remaining number in the network that the given wireless communication apparatus 10 belongs to, the working channel is changed to the given channel.

On the other hand, if the slot remaining number obtained in step S436 is smaller than the slot remaining number in the present working channel, the channel setting portion 172 determines whether or not all of the channels have been checked (step S440). If all of the channels have not been checked, the channel setting portion 172 returns to the processing of step S436 and obtains the slot remaining number for the other channels.

If it is determined that all of the channels have been checked in step S440, the channel setting portion 172 obtains from the memory portion 130 the information about the detected slot positions related to the given channel (step S442). Then, the channel setting portion 172 determines whether or not a non-detected slot number, which is derived by subtracting the number of detected slots in the given channel from the total slot number, is larger than the number of usage slots that are to be reserved by the wireless communication apparatus 10 (step S444). If it is determined that the slot remaining number in the present working channel is more than the non-detected slot number, the given wireless communication apparatus 10 performs a BPST identification scan to identify the position of the head of the super frame (step S450). Note that, in step S444, if the non-detected slot number is greater than the slot remaining number in the network that the given wireless communication apparatus 10 belongs to, the working channel may be changed to the given channel.

If the beacon identified by the BPST identification scan is received, the routine proceeds to step S454. On the other hand, if the beacon identified by the BPST identification scan is not received, it is determined that channel change is not possible. In this case, for example, it is displayed on a display portion of the wireless communication apparatus 10 that channel change is not possible (step S448). Alternatively, if it is determined in step S444 that the non-detected slot number is smaller than the slot remaining number in the present working channel, it is determined whether or not all of the channels have been checked. If all of the channels have not been checked, the routine returns to step S442. In the case that it is determined that all of the channels have been checked, the processing of step S448 is performed (step S446).

As explained above, according to the wireless communication apparatus 10 of the present embodiment, prior to the slot remaining number becoming equal to or less than the channel change slot remaining number, the communication portion 104 can scan the signals that allow the wireless communication usage state of each acquisition channel to be determined based on the various settings of the setting portion 170. Accordingly, when the slot remaining number becomes the channel change slot remaining number, the channel setting portion 172 can smoothly change the working channel to a channel that has a favorable wireless communication usage state.

In addition, if the working channel is changed to a channel that will allow the desired number of slots to be reserved, the given wireless communication apparatus 10 can perform wireless communication immediately after the working channel has been changed. Furthermore, the given wireless communication apparatus 10 can perform a scan of the acquisition channel in advance to simplify the complicated processing after the channel change.

Moreover, when the working channel is changed, the wireless communication apparatus 10 can rapidly determine which channel the working channel needs to be changed to by establishing respective conditions for performing scanning, and respective conditions for changing the working channel.

In addition, in the case that frames other than beacons are received as a result of scanning using a determined acquisition channel, the given wireless communication apparatus 10 can memorize the slots in which frames other than beacons were received, thereby allowing the slot reservation state in the determined acquisition channel to be determined even without receiving a beacon.

Moreover, if a determined acquisition channel is scanned and a beacon is received, the given wireless communication apparatus 10 can refer to the distributed reservation protocol information element 260 detailed in the beacon to determine the slot remaining number in the determined acquisition channel. According to the above-described structure, it is possible to reliably determine usage time as compared to a method in which interference time is timed based on simple carrier detection or the like.

In addition, the wireless communication apparatus 10 synchronizes, along with changing the working channel, the beacon transmission period with the beacon transmission period of the network that is to be changed to. Thus, after the working channel is changed, it is possible to omit complicated processing up till when the wireless communication apparatus 10 performs wireless communication using the network that is changed to.

It should be understood by those skilled in the art that various modifications, combinations, sub-combinations and alterations may occur depending on design requirements and other factors insofar as they are within the scope of the appended claims or the equivalents thereof.

For example, each step of the processing performed by the wireless communication apparatus 10 described in this specification does not have to be performed in time series in line with the order detailed in the flow charts, and instead may include processing that is performed in parallel or individually (for example, parallel processing or object oriented processing).

In addition, the wireless communication method as described above may be provided as a program that is run by a computer or as a storage medium that stores the program.

What is claimed is:

1. A wireless communication apparatus that forms part of an autonomous distributed wireless network that uses a time division control system, the wireless communication apparatus performing wireless communication using a working channel used with other apparatuses that form part of the autonomous distributed wireless network, the wireless communication apparatus comprising:
   a channel setting portion that sets the working channel and an acquisition channel, the acquisition channel being used to acquire signals transmitted from apparatuses not in the autonomous distributed network;
   a remainder obtaining portion that obtains a remaining time length that can be used to wirelessly communicate with the apparatuses that form part of the autonomous distributed wireless network using the working channel;
   an acquisition portion that acquires the signals transmitted from the apparatuses not in the autonomous distributed network; and
   a remainder determination portion that determines whether the remaining time length obtained by the remainder obtaining portion is equal to or less than a specified acquisition reference remaining number and determines whether the remaining time length is equal to or less than a specified change reference remaining number,
   wherein:
       if the remainder determination portion determines that the remaining time length is equal to or less than the acquisition reference remaining number, the acquisition portion acquires signals transmitted from the apparatuses not in the autonomous distributed network using the acquisition channel, and
       if the remainder determination portion determines that the remaining time length is equal to or less than the change reference remaining number, the channel setting portion changes the working channel based on the signals that have been acquired by the acquisition portion.

2. The wireless communication apparatus according to claim 1, wherein the change reference remaining number is a number that corresponds with the number of wireless communication apparatuses that form the autonomous distributed wireless network.

3. The wireless communication apparatus according to claim 1, wherein the acquisition reference remaining number is a number that corresponds with the number of types of acquisition channel that are set by the channel setting portion.

4. The wireless communication apparatus according to claim 1, wherein the change reference remaining number is a value that is based on the remaining time length that can be used for wireless communication using each acquisition channel, the remaining time length being estimated from signals acquired by the acquisition portion.

5. The wireless communication apparatus according to claim 1, wherein the acquisition portion acquires, while the wireless communication apparatus does not wirelessly communicate with the wireless communication apparatuses that form part of the autonomous distributed wireless network, signals that are transmitted from the other wireless communication apparatuses not in the autonomous distributed wireless network, using the acquisition channel.

6. The wireless communication apparatus according to claim 1, wherein
   the time division control system is a system that performs wireless communication using slot units that are obtained by time dividing frames with a specified cycle, and
   the channel setting portion changes the acquisition channel for each frame in the time division control system.

7. The wireless communication apparatus according to claim 1, wherein
   the acquisition portion acquires beacon signals from the other wireless communication apparatuses not in the autonomous distributed wireless network, and
   the channel setting portion changes the working channel based on time slot reservation information included in the beacon signals.

8. The wireless communication apparatus according to claim 1, wherein
   the acquisition portion acquires data signals from the other wireless communication apparatuses not in the autonomous distributed wireless network, and
   the channel setting portion changes the working channel based on a time length for which the acquisition portion acquired the data signals.

9. The wireless communication apparatus according to claim 1, wherein the channel setting portion changes the working channel, based on an acquisition result for the signals acquired by the acquisition portion, to a channel that is not used for wireless communication by the other wireless communication apparatuses not in the autonomous distributed wireless network.

10. The wireless communication apparatus according to claim 1, wherein the channel setting portion changes the working channel, based on an acquisition result for the signals acquired by the acquisition portion, to a channel for which a time length that is not used for wireless communication by the other wireless communication apparatuses not in the autonomous distributed wireless network is equal to or more than a time length that is, at the least, to be reserved in the autonomous distributed wireless network by the wireless communication apparatus.

11. The wireless communication apparatus according to claim 10, wherein the channel setting portion changes the working channel to a wireless channel that has, among the acquisition channels that have been used by the acquisition portion to acquire the signals, the longest time length that is not used by the other wireless communication apparatuses in the autonomous distributed wireless network for wireless communication.

12. The wireless communication apparatus according to claim 1, wherein the time division control system is a system that performs wireless communication using slot units that are obtained by time dividing a frame with a specified cycle, the wireless communication apparatus further comprising:
   a synchronization portion that, in the case that the channel setting portion changes the working channel to another channel that is being used to transmit beacon signals by the other wireless communication apparatuses not in the autonomous distributed wireless network, synchronizes the frame with a frame used by the other wireless communication apparatuses in the autonomous distributed wireless network.

13. A wireless communication system including a plurality of wireless communication apparatuses that form autonomous distributed wireless networks that use a time division control system, each of the wireless communication apparatuses being associated with a respective one of the wireless networks and performing wireless communication using a working channel that is used with the wireless communication apparatuses that form the respective one of the wireless networks, each of the wireless communication apparatuses comprising:
   a channel setting portion that sets the working channel and an acquisition channel, the acquisition channel being used to acquire signals transmitted from other wireless communication apparatuses not in the respective one of the wireless networks;
   a remainder obtaining portion that obtains a remaining time length that can be used to wirelessly communicate with the wireless communication apparatuses that form part of the respective one of the wireless networks using the working channel by the channel setting portion;
   an acquisition portion that acquires signals transmitted from the other wireless communication apparatuses not in the respective one of the wireless networks using the acquisition channel; and
   a remainder determination portion that determines whether the remaining time length obtained by the remainder obtaining portion is equal to or less than a specified acquisition reference remaining number and determines whether the remaining time length is equal to or less than a specified change reference remaining number,
   wherein:
      if the remainder determination portion determines that the remaining time length is equal to or less than the acquisition reference remaining number, the acquisition portion acquires signals transmitted from the other wireless communication apparatuses not in the respective one of the wireless networks, using the acquisition channel; and
      if the remainder determination portion determines that the remaining time length is equal to or less than the change reference remaining number, the channel setting portion changes the working channel based on the signals that have been acquired by the acquisition portion.

14. A wireless communication method for wireless communication apparatuses that form respective autonomous distributed wireless networks that use a time division control system, each wireless communication apparatus performing wireless communication using a working channel that is used with the wireless communication apparatuses that form a respective one of the wireless networks, the wireless communication method comprising the steps of:
   setting an working channel for one of the wireless networks that is used to wirelessly communicate with the wireless communication apparatuses of the respective one of the wireless networks;
   obtaining a remaining time length that can be used to wirelessly communicate with the wireless communication apparatuses in the respective one of the wireless networks using the working channel;
   determining whether the obtained remaining time length is equal to or less than an acquisition reference remaining number;
   setting, if the obtained remaining time length is determined to be equal to or less than the acquisition reference remaining number, an acquisition channel that is used to acquire signals transmitted from other wireless communication apparatuses not in the respective one of the wireless networks;
   acquiring signals transmitted from the other wireless communication apparatuses not in the respective one of the wireless networks using the acquisition channel;
   determining whether the obtained remaining time length is equal to or less than a specified change reference remaining number; and
   changing the working channel based on the acquired signals if the obtained remaining time length is determined to be less than or equal to the change reference remaining number.

15. A non-transitory computer-readable storage medium storing instructions which, when executed by a computer, perform a method comprising:
   setting a working channel that is used to perform wireless communication by first wireless communication apparatuses that form part of an autonomous distributed wireless network that uses a time division control system;
   obtaining a remaining time length that can be used to wirelessly communicate with the first wireless communication apparatuses using the working channel;
   determining whether the obtained remaining time length is equal to or less than an acquisition reference remaining number;
   setting, if the obtained remaining time length is determined to be equal to or less than the acquisition reference remaining number, an acquisition channel that is used to acquire signals transmitted from second wireless communication apparatuses not in the autonomous distributed wireless network;
   acquiring signals transmitted from the second wireless communication apparatuses using the acquisition channel;
   determining whether the obtained remaining time length is equal to or less than a specified change reference remaining number; and
   changing the working channel based on the acquired signals if the obtained remaining time length is determined to be less than or equal to the change reference remaining number.

* * * * *